US 8,412,656 B1
Apr. 2, 2013

(12) United States Patent
Baboo et al.

(10) Patent No.: US 8,412,656 B1
(45) Date of Patent: Apr. 2, 2013

(54) METHOD AND SYSTEM FOR BUILDING A CONSUMER DECISION TREE IN A HIERARCHICAL DECISION TREE STRUCTURE BASED ON IN-STORE BEHAVIOR ANALYSIS

(75) Inventors: Priya Baboo, State College, PA (US); Satish Mummareddy, Bethesda, MD (US); Rajeev Sharma, State College, PA (US); Varij Saurabh, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 902 days.

(21) Appl. No.: 12/583,080

(22) Filed: Aug. 13, 2009

(51) Int. Cl.
*G06E 1/00* (2006.01)
*G06E 3/00* (2006.01)
*G06F 15/18* (2006.01)
*G06G 7/00* (2006.01)

(52) U.S. Cl. ........................................................ 706/20

(58) Field of Classification Search ........................ None
See application file for complete search history.

(56) References Cited

U.S. PATENT DOCUMENTS

| | | | |
|---|---|---|---|
| 5,331,544 A | 7/1994 | Lu et al. | |
| 5,974,396 A | 10/1999 | Anderson et al. | |
| 7,076,456 B1 | 7/2006 | Rofrano | |
| 7,130,836 B2 | 10/2006 | Grosser et al. | |
| 2001/0014868 A1 | 8/2001 | Herz et al. | |
| 2003/0063779 A1* | 4/2003 | Wrigley | 382/116 |
| 2005/0273376 A1* | 12/2005 | Ouimet et al. | 705/10 |
| 2005/0273377 A1* | 12/2005 | Ouimet et al. | 705/10 |
| 2006/0010027 A1 | 1/2006 | Redman | |
| 2006/0010030 A1 | 1/2006 | Sorensen | |
| 2006/0200378 A1 | 9/2006 | Sorensen | |
| 2008/0055105 A1* | 3/2008 | Blum et al. | 340/815.4 |
| 2008/0142599 A1* | 6/2008 | Benillouche et al. | 235/462.41 |
| 2008/0249870 A1* | 10/2008 | Angell et al. | 705/14 |
| 2008/0306756 A1 | 12/2008 | Sorensen et al. | |
| 2009/0116698 A1* | 5/2009 | Zhang et al. | 382/111 |

OTHER PUBLICATIONS

U.S. Appl. No. 11/805,321, Sharma, et al.
U.S. Appl. No. 11/818,554, Sharma, et al.
U.S. Appl. No. 11/999,649, Jung, et al.
U.S. Appl. No. 12/011,385, Sharma, et al.
U.S. Appl. No. 12/215,877, Sharma, et al.

* cited by examiner

*Primary Examiner* — Li-Wu Chang

(57) ABSTRACT

The present invention is a system and method for determining the hierarchical purchase decision process of consumers in front of a product category. The decision path of consumers is obtained by combining behavior data with the category layout and transaction data based on observed actual in-store purchase behavior using a set of video cameras and software for extracting sequence and timing of each consumer's decision process. A hierarchical decision tree structure comprises nodes and edges, wherein a node represents the state-of-mind of the consumer, the number of nodes is predefined, and an edge represents the transition of the decision. The decisions for each product group are captured down to the product attribute level and analyzed by demographic group. The outcome provides relative importance of each product attribute in the purchase decision process, and helps retailers and manufacturers to evaluate the layout of the category and customize it for key segment.

20 Claims, 24 Drawing Sheets

621
CATEGORY A AT LOCATION L1 REPRESENTED BY POLYGON 1
CATEGORY B AT LOCATION L2 REPRESENTED BY POLYGON 2
CATEGORY C AT LOCATION L3 REPRESENTED BY POLYGON 3
CATEGORY D AT LOCATION L4 REPRESENTED BY POLYGON 4
CATEGORY E AT LOCATION L5 REPRESENTED BY POLYGON 5

622
SHOPPER 1 PATH
– (X11, Y11, T1), (X12, Y12M T2), ..., (X1N, Y1N, TN)
SHOPPER 2 PATH
– (X21, Y21, T1), (X22, Y22M T2), ..., (X2N, Y2N, TN)

⋮

SHOPPER K PATH
– (XK1, YK1, T1), (XK2, YK2M T2), ..., (XKN, YKN, TN)

623
SHOPPER 1 SEQUENCE – ACEA
SHOPPER 2 SEQUENCE – CDE

⋮

SHOPPER K SEQUENCE – AC

Fig. 9

| 4 AT A TIME | | 3 AT A TIME | | 2 AT A TIME | |
|---|---|---|---|---|---|
| GROUP | % OF CO-OCCURRENCES | GROUP | % OF CO-OCCURRENCES | GROUP | % OF CO-OCCURRENCES |
| ABCD | 0.01 | ABC | 0.06 | AB | 0.10 |
| ABCE | 0.03 | ABD | 0.03 | AC | 0.15 |
| ABDE | 0.04 | ABE | 0.02 | AD | 0.35 |
| ACDE | 0.01 | ACD | 0.04 | AE | 0.10 |
| BCDE | 0.02 | ACE | 0.01 | BC | 0.45 |
| | | ADE | 0.20 | BD | 0.10 |
| | | BCD | 0.05 | BE | 0.01 |
| | | BCE | 0.01 | CD | 0.05 |
| | | BDE | 0.02 | CE | 0.06 |
| | | CDE | 0.03 | DE | 0.10 |

| 4 AT A TIME | | 3 AT A TIME | | 2 AT A TIME | |
|---|---|---|---|---|---|
| GROUP | % OF CO-OCCURRENCES | GROUP | % OF CO-OCCURRENCES | GROUP | % OF CO-OCCURRENCES |
| ABDE | 0.04 | ADE | 0.20 | BC | 0.45 |
| ABCE | 0.03 | ABC | 0.06 | AD | 0.35 |
| BCDE | 0.02 | BCD | 0.05 | AC | 0.15 |
| ABCD | 0.01 | ACD | 0.04 | AB | 0.10 |
| ACDE | 0.01 | ABD | 0.03 | AE | 0.10 |
| | | CDE | 0.03 | BD | 0.10 |
| | | ABE | 0.02 | DE | 0.10 |
| | | BDE | 0.02 | CE | 0.06 |
| | | ACE | 0.01 | CD | 0.05 |
| | | BCE | 0.01 | BE | 0.01 |

Fig. 11

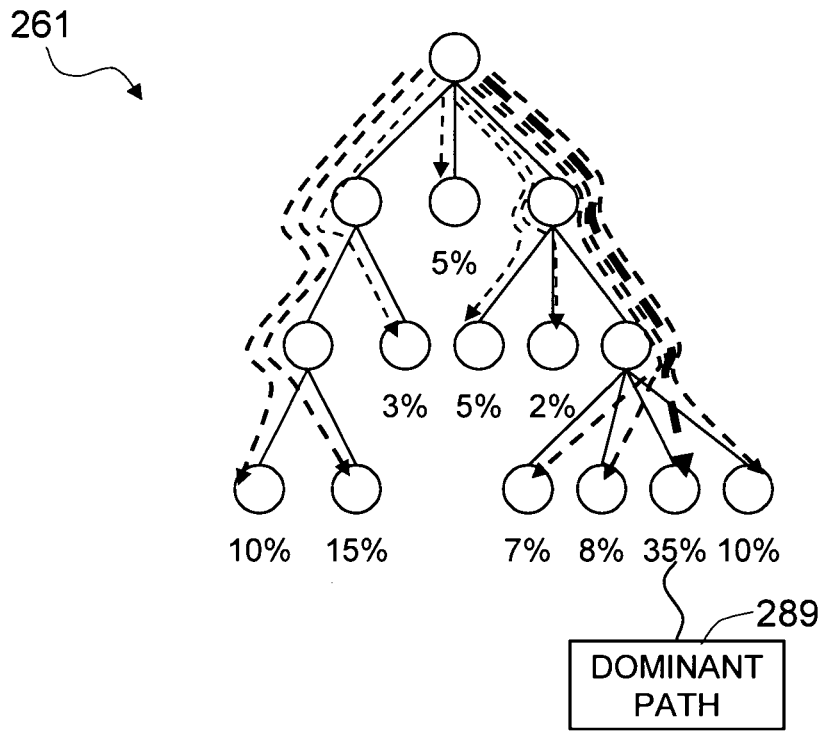
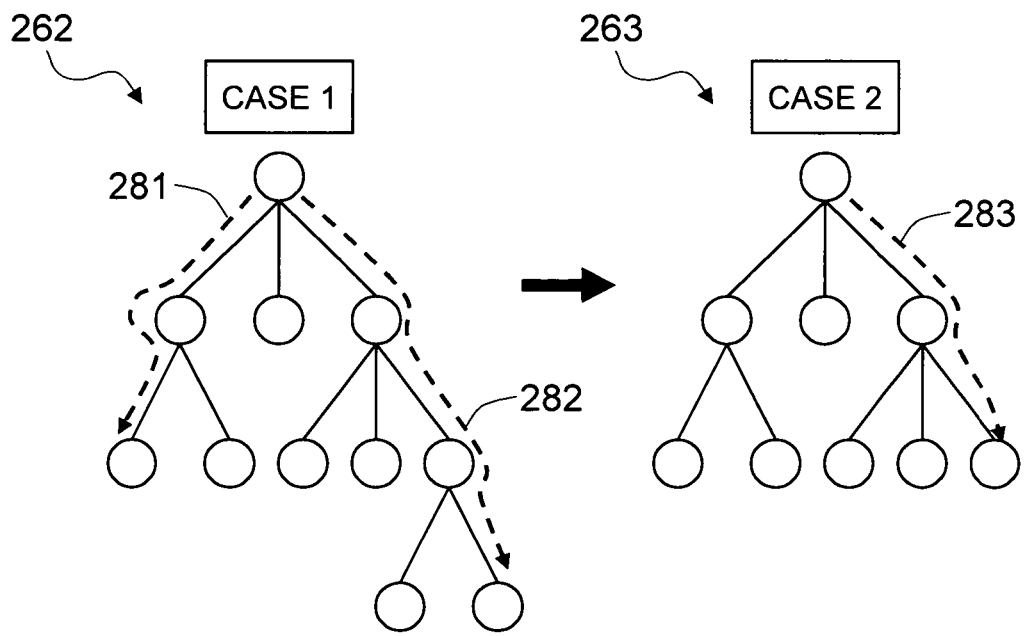
Fig.14

METHOD AND SYSTEM FOR BUILDING A CONSUMER DECISION TREE IN A HIERARCHICAL DECISION TREE STRUCTURE BASED ON IN-STORE BEHAVIOR ANALYSIS

BACKGROUND OF THE INVENTION

1. Field of the Invention

The present invention is a system, method, and apparatus for determining the hierarchical purchase decision process (consumer decision trees) of consumers in front of a product category (a set of products that meet the same need of consumers), which is organized in a coordinate system either as brand or product attribute blocks, in a retail store, wherein shopping consideration and the decision path of consumers is obtained by combining behavioral data with the category layout and transactional data.

2. Background of the Invention

U.S. Pat. No. 7,130,836 of Grosser, et al. (hereinafter Grosser) disclosed an apparatus and method for a computer-aided decision-making system. Grosser provides assistance and feedback to a person in a decision-making context that helps the person to evaluate and rank various choices based on criteria he or she provides. Grosser is intended for consumer decision making in an online environment, such as the Internet. For example, Grosser used buying a home or buying a car online as the examples of applications.

Although Grosser claims that their system can be used for various decision-making applications, Grosser is foreign to the idea of automatically determining the hierarchical purchase decision process of shoppers in front of a product category in the retail store based on observation of the physical shopping behavior. Especially, Grosser is foreign to the idea of obtaining the shopping decision path of shoppers by combining behavioral data in images processed by video analytics with the category layout and transactional data.

Grosser is also a decision support system, whereas the present invention is not necessarily intended for aiding the decision process of shoppers. One of the objectives of the present invention in a preferred embodiment is to automatically determine the decision process of shoppers without any involvement from the shoppers in the physical space. The present invention obtains unaided shopper behavior from the described apparatus, and helps retailers and manufacturers to match the category layout based on the shopper's decision process, thus enabling a convenient shopping experience.

U.S. Pat. No. 7,076,456 of Rofrano (hereinafter Rofrano) disclosed a system that utilizes question and answer trees. In Rofrano, a potential buyer can select from a pre-ranked list of questions and then follow the answers in a decision tree-type way to the final product choice/answer. The questions are ranked according to importance, which is based on the various factors, including the past frequencies asked by other buyers, an order of questioning that would normally be asked by a salesperson, and statistical data based on the effectiveness of past questions. The system in Rofrano essentially takes the place of an actual salesperson, and is designed for developing an electronic catalog in which the search can be customized based on the customer's preferences.

The system disclosed by Rofrano applies only to purchasing from an electronic catalog and cannot be employed for tracking the behavior of shoppers in a retail environment.

U.S. Pat. No. 5,331,544 of Lu, et al. (hereinafter Lu) disclosed an exemplary automated system for collecting market research data. In Lu, an automatic face recognition system is disclosed to identify a customer in a retail environment, which can measure the shopping frequency at a given store. Lu also noted that a shopper's attentiveness to a display may be correlated with purchases of products and with other demographic purchase-related variables.

However, Lu is foreign to the idea of analyzing shopper behavior based on movement in a retail store. Furthermore, Lu is entirely foreign to the idea of obtaining the shopping decision path and tree based on the shopping behavior. Lu's system can be used only to identify frequent shoppers by matching facial images of the shopper, and to guess that a product purchase was possibly the result of the shopper viewing the display. However, Lu cannot be used to determine the hierarchical decision process of shoppers, as outlined in the present invention.

U.S. Pat. No. 5,974,396 of Anderson, et al. (hereinafter Anderson) disclosed a system for gathering and analyzing customer purchasing information based on the relationship between product and consumer clustering. In Anderson, product information is gathered by type and manufacturer, and the products are grouped into product clusters. Consumers are grouped into consumer clusters based on common consumer demographics and other characteristics. Consumer retail transactions are analyzed in terms of the product and consumer clusters, and the relationships between the consumers and the products are determined by retailers. Anderson enables the retailers to target marketing materials toward specific consumer groups based on their buying habits, needs, and demographics, and to make business decisions based on the queried information from the product and consumer relationship database.

Anderson is also foreign to the idea of obtaining the shopping decision path of shoppers based on behavioral data in images processed by video analytics and constructing a decision tree based on the accumulated decision paths. Further, Anderson can only determine the buying patterns of consumers, and cannot identify the decision-making process. Understanding the hierarchical decision-making process and correlating it with the purchase data, as detailed by the present invention, can help to identify growth opportunities; this cannot be achieved by Anderson.

U.S. Pat. Appl. Pub. No. 20060010027 of Redman (hereinafter Redman) disclosed a system for determining movement of customers to analyze customers' decisions and optimize product presentation with traffic pattern analysis. Redman noted that the observation of the traffic pattern can be processed by a manual observation or observation with cameras and facial recognition technology, which could record customers' faces. However, in a preferred embodiment, Redman used a RFID tag and a tag reader system to track the traffic patterns of customers.

Although Redman disclosed an idea of using cameras to observe customers' traffic patterns, this cannot be employed to track the actual decision-making process of shoppers in front of a category as discussed in the present invention. Redman is foreign to the idea of the detailed processes in the present invention for obtaining the behavioral data. Especially, Redman is further foreign to the detailed methods of accumulating unaided hierarchical decision paths as explained in the present invention.

U.S. Pat. Appl. Pub. No. 20080306756 of Sorensen, et al. (hereinafter Sorensen 20080306756) disclosed a shopper view tracking and analysis system. Sorensen 20080306756 is a system that tracks the views of an active, in-store shopper. Sorensen 20080306756 covers a device that is essentially a head-mounted camera, which moves with the shopper's view, in order to pinpoint what the shopper is looking at. Sorensen 20080306756 also covers analytical techniques to fully capture and statistically assess the view data generated by the shopper's head camera. These techniques could be used to create such measures as the average focal point of a typical shopper or the average "looking" time for any category within the store.

Sorensen 20080306756 does not teach a technique to develop the hierarchical decision process of shoppers in front of product categories. Sorensen 20080306756 is an exemplary method in the prior arts that requires shoppers' involvement in gathering the data about the shopping experience in a cumbersome manner. In the methods of Sorensen 20080306756, (i) the evaluation can be biased, leading to faulty conclusions about the decision process, since the respondents are part of a recruited panel, and (ii) the sample size is limited because of the cost involved in acquiring information, thus providing inaccurate information on shopper behavior in front of a category. On the contrary, the present invention can obtain information about the hierarchical decision process of shoppers in an unaided manner, based on the observation of video-based data. Further, the data obtained by the present invention will be robust, since the system is capturing shopper behavior from a large number of shoppers who shop the category of interest during a predefined period of time rather than obtaining the information from a recruited sample, which can be subjective.

U.S. Pat. Appl. Pub. No. 20060200378 of Sorensen (hereinafter Sorensen 20060200378) disclosed a purchase selection behavior analysis system and method. By using a wireless tracking system, Sorensen 20060200378 consists of a market research method that follows a shopper traveling through a store. Predetermined products are also equipped with devices, so aspects of the shopping experience are recorded, such as shopping time in front of displays, distance from displays, and various angles of the shopper's view in relation to displays. Specific time interval analyses are also included in Sorensen 20060200378, which cover the aforementioned aspects of the shopper experience. Sorensen 20060200378 can only be used for determining shopper exposure to display(s) but cannot be applied to identify the decision process in front of the display, even more for in a particular product category, as defined by the present invention.

Sorensen 20060200378 is foreign to the idea of constructing a decision tree based on the accumulated decision paths that are calculated based on an analysis of captured video images. Furthermore, Sorensen 20060200378 is foreign to the idea of constructing a decision tree based on the accumulated shopping interaction, observed by a video analytic system, in front of product categories as disclosed in the present invention, such as based on hand movement tracking.

U.S. Pat. Appl. Pub. No. 20060010030 of Sorensen (hereinafter Sorensen 20060010030) disclosed a system and method for modeling shopping behavior. Sorensen 20060010030 takes shopper path data, product position data, and a general store map, and attempts to model the shopping behavior in different store layouts. As Sorensen 20060010030 discusses, shopper behavior, such as an expected shopper flow and expected purchasing patterns, can be predicted using average relationships between traffic points and product points, based upon the positions of the products and the behavioral domains within a specific store. The intention of the prior art is to normalize shopper behavior in a set of stores with different layouts and to model expected traffic flow and purchase patterns. However, Sorensen 20060010030 cannot be employed for developing the hierarchical decision process of shoppers in front of a product category, as described in the current invention. Sorensen 20060010030 is foreign to the idea of constructing a decision tree based on the accumulated decision paths that are calculated based on an analysis of captured video images and the accumulated shopping interaction, observed by a video analytic system, in front of product categories, as disclosed in the present invention.

Further, Sorensen 2006010030 utilizes RFID and infrared tracking systems for obtaining shopper path data. These techniques are not effective, since they are dependent on the shoppers traveling with carts while in the store; in instances when the shoppers leave the cart at the end of an aisle or in the periphery to shop a category in an aisle, the data obtained from the system will be judgmental and incorrect. Also, Sorensen 2006010030 is foreign to the idea of employing computer vision-based technology, as described in the present invention, to automatically track shopper behavior in front of a category for developing the decision trees.

U.S. Pat. Appl. Pub. No. 20010014868 of Herz, et al. (hereinafter Herz) disclosed a system for the automatic determination of customized prices and promotions. Herz is an online system for presenting online shoppers with customized prices and promotions. The system automatically constructs and updates profiles of shoppers based on their demographics and their history of shopping behavior, which includes both their purchases and their requests for, or reactions to, product information. A shopper's behavior in response to various possible product offers is then predicted by considering how those shoppers with the most similar profiles have behaved with respect to the most similar offers. The system then constructs customized prices and promotions for that shopper.

Herz is only focused on customizing prices and promotions for an online shopper by predicting their behavior and cannot be applied for understanding the decision process of shoppers in a physical retail environment, as detailed in the present invention. Further, the usage of video analytics techniques to determine the decision process of shoppers in a retail environment is foreign to Herz.

SUMMARY

Manufacturers have been developing consumer decision trees (CDT) for several years. Traditional approaches for developing CDTs—household panel purchase data, ethnography, and shop-alongs—have clear drawbacks, since they are either based on the consumer's interpretation of the purchase decision process or a human observer's point of view on the decision process, providing limited understanding of the actual behavior. The present invention addresses these limitations by unobtrusively capturing actual purchase behavior in front of the category from massive samples of shoppers—all consumers who shop the category in a specific time period—providing objectivity and precision not achievable through other data collection methods.

In an exemplary embodiment, the present invention is a system, method, and apparatus for determining the hierarchical purchase decision process (consumer decision trees) of consumers in front of a product category (a set of products that meet the same need of consumers), which is organized in a coordinate system either as brand or product attribute blocks, in a retail store. Shopping consideration and the decision path of consumers is obtained by combining behavior data with the category layout and transaction data. The present invention constructs a hierarchical decision tree structure that comprises nodes and edges, wherein a node represents the state-of-mind of the consumer, wherein the number of nodes is predefined, and wherein an edge represents the transition of the decision.

The hierarchical decision process is determined based on observed actual in-store purchase behavior using a set of video cameras and proprietary software for extracting the sequence and timing of each consumer's decision process. The method and system proposed in the invention will include both top-down video cameras, as well as cameras positioned at the shelf, to capture the decision process, including gaze analysis and eye tracking.

In another exemplary embodiment, semi-automated data annotation approaches will also be utilized to determine the sequence, timing, and consumers' point of focus in the coordinate system. Overall, the system will determine the hierarchical decision process of consumers in front of a category, based on spatiotemporal information using the video analytics technology. This aggregated consumer behavior data will be combined with transaction data to provide a holistic picture of the purchase decision process in the store.

The hierarchical decision process, obtained by clustering of consumer behavior data, not only identifies the sequence or order of the decision but also quantifies the volume of consumers at each level in the decision process, thus determining the relative importance of each product group. The frequency of cross-comparisons between product groups not only helps to determine the category structure, but also provides a deeper understanding of product distinction and substitutability between a set of products. Moreover, the decisions of consumers for each product group are captured very clearly down to the product attribute level. Such in-depth understanding provides an accurate picture of the relative importance of each product attribute, such as flavor, size, and price, in the purchase decision process.

The present invention can also quantify the amount of time spent by consumers for making each decision, thereby determining the relative importance or the complexity. Combining this information with the hierarchical decision process, retailers and manufacturers can evaluate whether or not the coordinate layout of the category matches the needs and the decision process of consumers.

The present invention will provide further granularity by determining the hierarchical decision process of consumers by demographic groups—gender, age-range, and ethnicity—as well as by need states and occasions. Such granular understanding of the decision process for each consumer segment will help both retailers and manufacturers to customize the category layout for their key segment(s), thereby providing a more convenient and enjoyable shopping experience.

Therefore, in a preferred embodiment, it is an objective of the present invention to provide a novel method and apparatus for building a consumer decision tree based on the observation of in-store behavior by measuring a set of consumer behavior metrics. The present invention captures a plurality of input images of people by at least a means for capturing images in a store area. The plurality of input images is processed in order to analyze the behavior of the people with regard to the decision activity of the people tied to the category based on the behavior analysis. A plurality of datasets is constructed by accumulating the decision activities. The present invention constructs a hierarchical decision tree structure that comprises nodes and edges, wherein a node represents the state-of-mind of the consumer, wherein the number of nodes is predefined, and wherein an edge represents the transition of the decision. The decision is measured based on the actual purchase behavior of consumers, like interaction with the products and travel paths to categories, as opposed to using intercepts or panels to develop them In another preferred embodiment, in contrast to the conventional method, it is an objective of the present invention to use an automatic behavior measurement, including shopping paths and interaction with the products, to observe the decision processes and construct the decision trees of consumers, without involving the consumers' participation and obtrusive interception. Therefore, the gathered data reflects the true state of consumers' actual decision made at the point of purchase. The present invention objectively captures purchase behavior from a large volume of consumers without intruding on their decision process, thus the gathered data is unbiased.

In the preferred embodiment of the present invention, the decision behavior is an observable behavior by automatic video analysis. Using the exhibited behavior, such as the shopping path, browsing activity for a product, or interaction with a product, the decision tree is calculated to identify the hierarchical decision process. Based on the observed path of the consumer and the associated product data in the space of travel, it can be known what the person did vs. did not do. In addition, the observable behaviors can also be associated with the sales data of the products that are located where the consumers' behaviors are measured. Examples of the observable behaviors include time of interaction, pre-interaction (like prior location of visit), exposure to the product display and attributes, and sensory activity behavior to make decisions.

In another exemplary embodiment, the present invention may integrate a semi-automated method to compute the decision tree to identify behaviors that cannot be automatically observed by the technology or to identify granular details of consumer interaction with the product, like comparing brands. This semi-automated method can compliment other data sources, like in-store intercepts, planograms, and point-of-sale data. However, it is important to note that this semi-automated method is not the preferred embodiment of the present invention, and it is another objective of the present invention to use the semi-automated method only as a complementary method to the automated method in the preferred embodiment of the present invention.

DRAWINGS

Figures

FIG. 9 shows exemplary categories and the process of detecting the stopping sequences of shoppers in relation to the predefined categories.

FIG. 10 shows an exemplary table for correlated stopping sequences of shoppers based on co-occurrences.

FIG. 11 shows an exemplary table for the ranked group of categories based on the correlation.

FIG. 14 shows an exemplary scheme of dominant path calculation and a level of decision steps calculation.

DETAILED DESCRIPTION OF THE INVENTION

Figure 1:
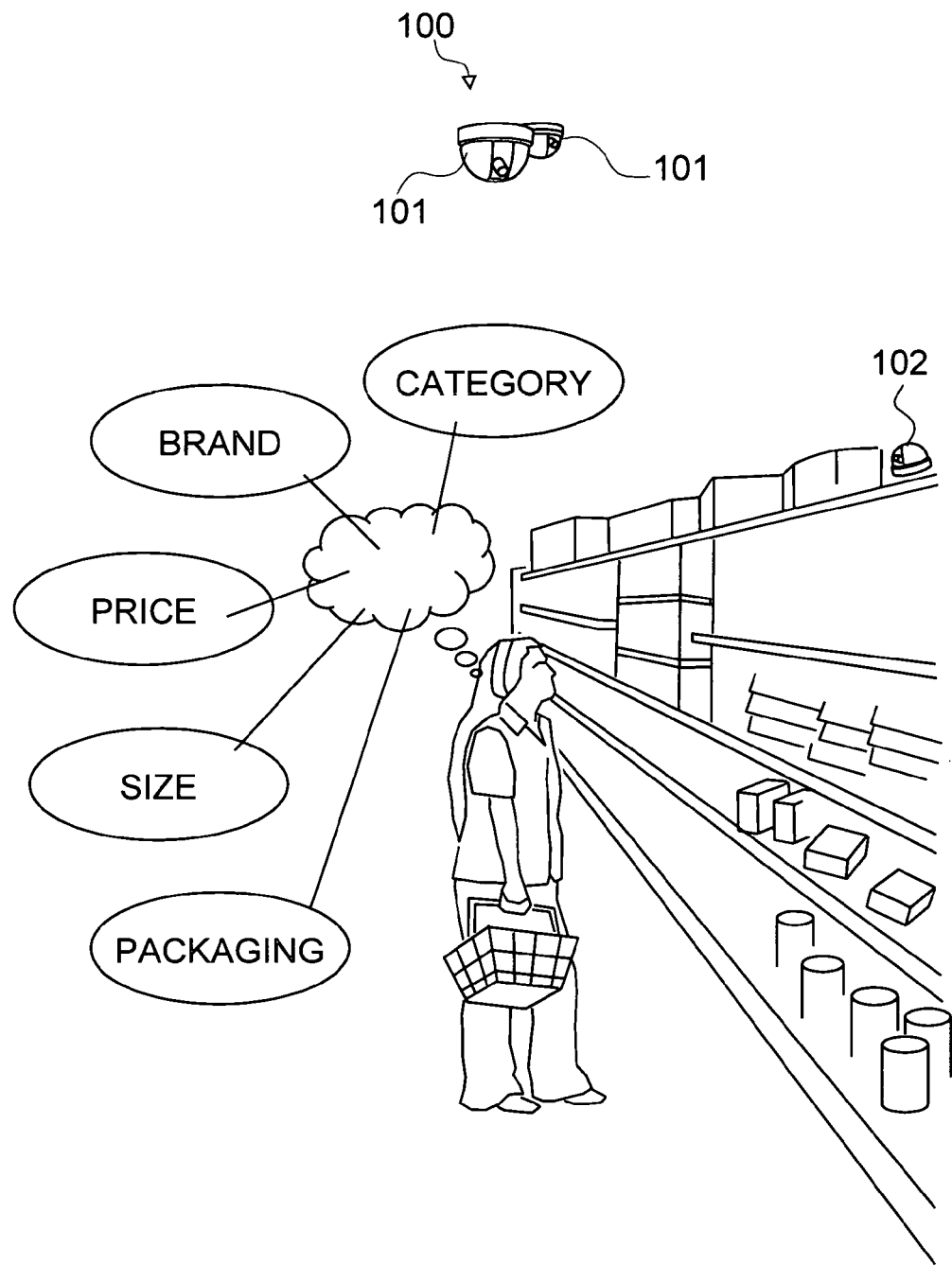
FIG. 1 shows an exemplary application of an embodiment of the present invention in a store area.

FIG. 1 shows an exemplary application of an embodiment of the present invention in a store area.

It is important for the manufacturers and retailers to understand the decision processes of consumers. For example, it is important not only to understand the pack size and type of the snack that is purchased, but also to understand what the decision process is; in other words, how it is purchased. The consumer decision tree, as described in the present invention, provides a clear understanding of the decision process of consumers in front of a product category, thus helping to identify opportunities for improving the shopping experience and increasing the number of purchases for the category and store. Conventional approaches for developing CDTs—household panel purchase data, ethnography, and shop-alongs—have clear drawbacks, since they are either based on the consumer's interpretation of the purchase decision process or a human observer's point of view on the decision process, providing limited understanding of the actual behavior.

The present invention is a novel method and apparatus that overcomes the limitations of the conventional approaches of developing consumer decision trees (CDT)s, by unobtrusively capturing the actual purchase behavior of a large number of shoppers—all consumers who shop the category in a specific time period—in front of the category, providing objectivity and precision not achievable through other data collection methods.

In an exemplary embodiment, the present invention is a system, method, and apparatus for determining the hierarchical purchase decision process (consumer decision trees) of consumers in front of a product category (a set of products that meet the same need of consumers) in a retail store. The product category can be organized in a coordinate system either as brand or as product attribute blocks. Shopping consideration and the decision path of consumers is obtained by combining behavioral data with the category layout and transactional data.

The hierarchical decision process is determined based on observed actual in-store purchase behavior, i.e., in-store observation of consumer behavior, using a set of video cameras, such as means for capturing images 100 in FIG. 1, and proprietary software for extracting the sequence and timing of each consumer's decision process. The method and system proposed in the invention include the usage of both top-down video cameras, as well as cameras positioned at the shelf, to capture the decision process, including gaze analysis and eye tracking. The present invention captures a plurality of input images of the people by at least a means for capturing images, e.g. 100, in the vicinity of the product category. The means for capturing images comprises digital or analog cameras, covering the area of interest in the vicinity of the product category. A means for capturing images is either a first means for capturing images 101 for a top-down view of the area of the product category, or a second means for capturing images 102 for a frontal view of consumers from the location of product categories. For simplicity, the term camera will be used to indicate the means for capturing images in the specification for the present invention. The input images are processed by automated video analytic algorithms in order to measure the behavior patterns and demographics of each consumer with regard to the decision activity. A plurality of datasets is constructed by accumulating the decision activities. The decision is measured based on the actual purchase behavior of consumers, like interaction with the products and travel paths to categories, as opposed to using in-store intercepts or household panels to develop them.

In a preferred embodiment, in contrast to the conventional method, the present invention uses an automatic behavior measurement, including shopping paths and interaction with the products, to observe the decision processes and construct the decision trees of consumers, without consumer participation and obtrusive interception. Therefore, the gathered data reflects the actual behavior of consumers at the point of purchase. The present invention objectively captures a large amount of statistical data, thus the gathered data is unbiased.

In the preferred embodiment of the present invention, the decision behavior is an observable behavior by automatic video analysis. Using the exhibited behavior, such as the shopping path, browsing activity for a product, or interaction with a product, the decision tree is calculated to identify the hierarchical decision process. Based on the observed path of the consumer and the associated product data in the space of travel, it can be known what the person did vs. did not do. In addition, the observable behaviors can also be associated with the sales data for the products at the location where the consumers' behaviors are measured. Other examples of the observable behaviors include time of interaction, pre-interaction (like prior location of visit), exposure to the product display and attributes, and sensory activity behavior to make decisions.

In another exemplary embodiment, the present invention may integrate a semi-automated method to compute the decision tree to identify behaviors that cannot be automatically observed by the technology or to identify granular details of consumer interaction with the product, like comparing brands. This semi-automated method can compliment other data sources like in-store intercepts, planograms, and point of sale data. The semi-automated method can also comprise a method to construct parts of a decision tree that cannot be visually or automatically observed. For example, the semi-automated data annotation approaches can be utilized to determine the sequence, timing, and consumers' point of focus in the coordinate system. However, it is important to note that this semi-automated method is not the preferred embodiment of the present invention, and it is another objective of the present invention to use the semi-automated method only as a complementary method to the automated method in the preferred embodiment of the present invention.

Overall, the system will determine the hierarchical decision process of consumers in front of a category based on spatiotemporal information using the video analytics technology. This aggregated consumer behavior data will be combined with transactional data to provide a holistic picture of the purchase decision process in the store.

The hierarchical decision process, obtained by the clustering of consumer behavior data, not only identifies the sequence or order of the decision, but also quantifies the volume of consumers at each level in the decision process, thus determining the relative importance of each product group.

The frequency of cross-comparisons between product groups not only helps to determine the category structure, but also provides a deeper understanding of product distinction and substitutability between a set of products.

Moreover, the decisions of consumers for each product group are captured very clearly, down to the product attribute level. Such in-depth understanding provides an accurate picture of the relative importance of each product attribute, such as flavor, size, and price, in the purchase decision process. The attributes comprise brand, product type, size, flavor, and price. The present invention associates the sequence, timing, and the area of focus on the coordinate system to arrive at the hierarchical decision process. For example, if the category in the coordinate system is organized by a product attribute, such as flavor, the attributes are mapped with the behavior, using the spatiotemporal information and the percentage of consumers who first looked at flavor and then started comparing brands with the flavor attribute within the category, thus providing a measurement.

The present invention will also quantify the amount of time spent by consumers for making each decision, thereby determining the relative importance or the complexity among the shopping decisions. Combining this information with the hierarchical decision process, retailers and manufacturers can evaluate whether or not the coordinate layout of the category matches the needs and the decision process of consumers.

The present invention will provide further granularity by determining the hierarchical decision process of consumers by demographic groups as well as by need states and occasions. The attributes for the demographic groups comprise gender, age range, and ethnicity. Such granular understanding of the decision process for each consumer segment will help both retailers and manufacturers to customize the category layout for their key segment(s), thereby providing a more convenient and enjoyable shopping experience.

Figure 2:
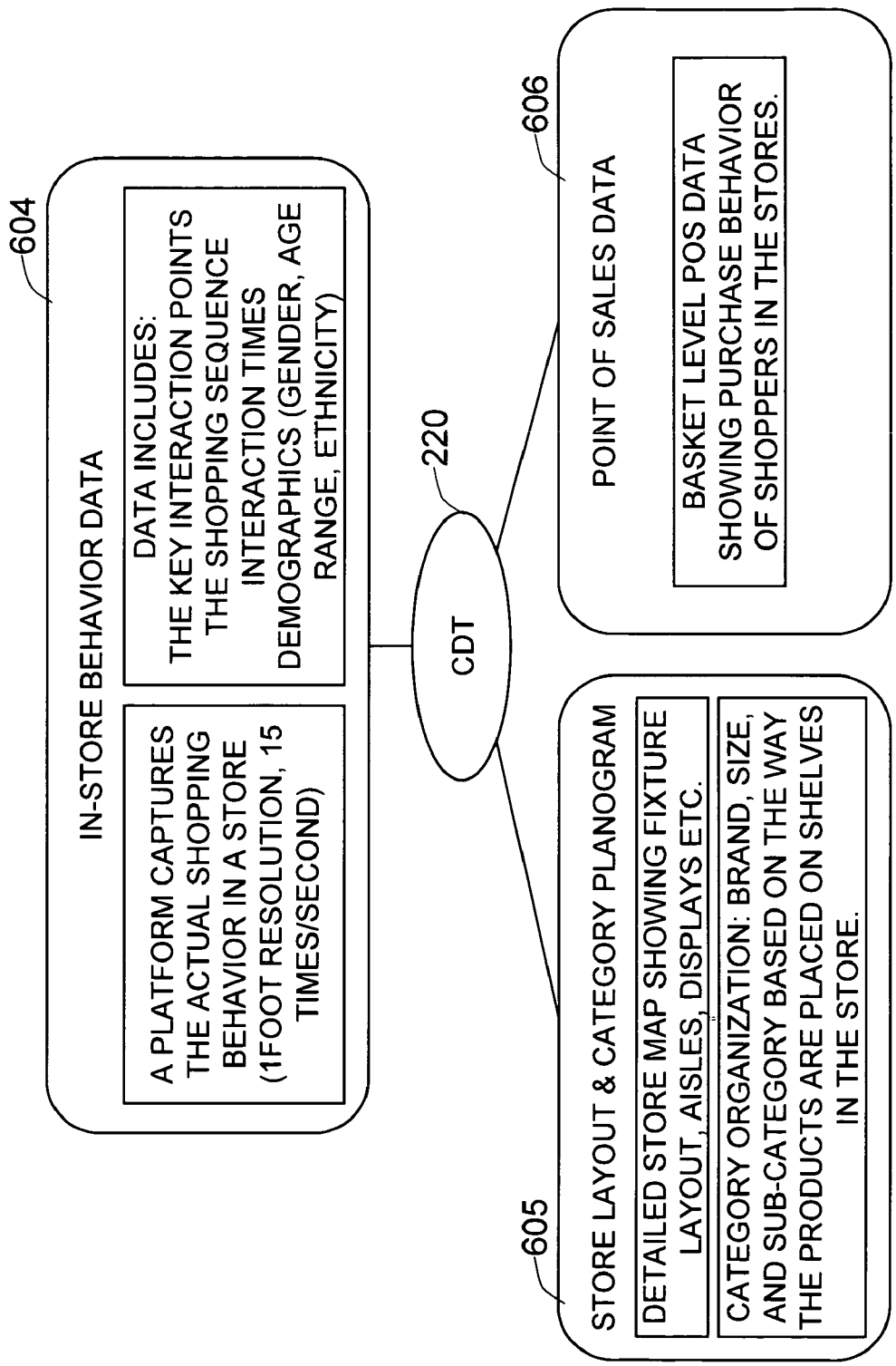
FIG. 2 shows three exemplary sources of data that are integrated together to provide a holistic picture of the consumer decision process, in the present invention.

FIG. 2 shows the integration of three exemplary data sources in the present invention.

In an exemplary embodiment, the present invention combines data from multiple sources. For example, the data sources will comprise data from the proprietary measurement platform, such as in-store behavior data 604, detailed information of the store layout and category planogram 605, and transaction data 606. A goal of utilizing multiple data sources is to provide a holistic view of the hierarchical decision process of shoppers in a category. This consolidated view provides a clear understanding of the shopping consideration and the decision path of shoppers. However, as noted earlier, the key is to primarily utilize the data from the actual observation of physical interaction in the present invention.

In-store behavior data 604 from the platform includes identifying the types of interaction with the products, their shopping sequence, and the amount of time spent making a decision. These metrics can be broken down by demographic groups—gender, age range, and ethnicity—to provide a clear understanding of the similarities and differences in the decision-making process of various shopper segments. The platform captures the actual shopping behavior in a store by a predefined resolution, e.g., 1 foot resolution, in images of 15 frames per second. The data for the store layout and category planogram 605 includes a detailed store map showing fixture layout, aisles, displays, etc. The category layout is based on the way the products are placed on the store shelves. The data from the point-of-sale (POS) 606 includes transaction data by baskets by time periods.

The present invention combines data from multiple sources in an effort to provide a complete picture of the in-store shopping process for helping retailers and manufacturers to improve store, category, and brand productivity.

Figure 3:
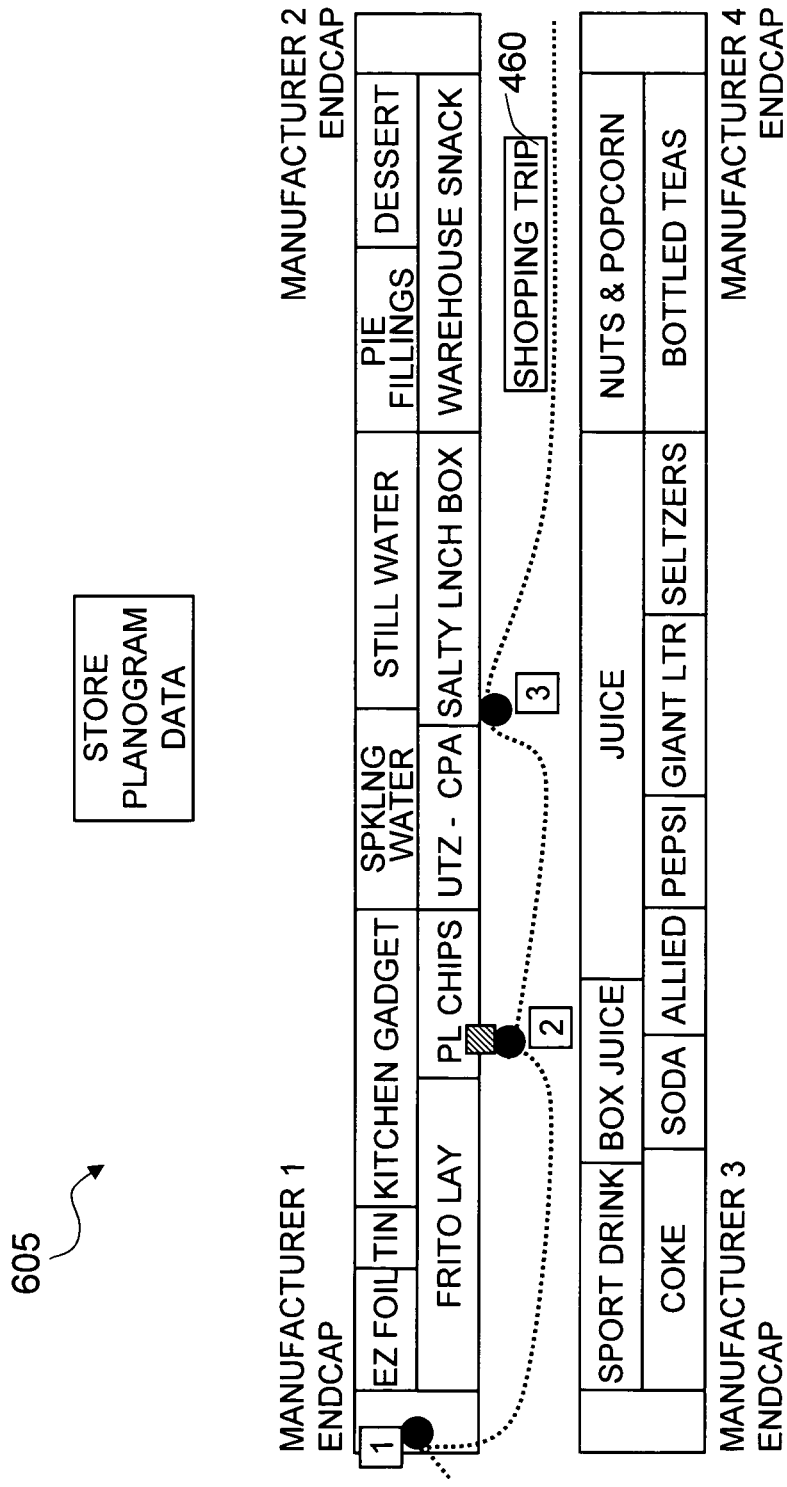
FIG. 3 shows an exemplary planogram data of an aisle and a shopping track with regard to the process of developing a decision tree.

FIG. 3 shows an exemplary planogram data of an aisle and a shopping track with regard to the process of developing a decision tree.

The shopper trip data, such as 460, is aggregated into a data structure, consisting of each decision and sequence of decisions for each shopper. The store location representing various product attributes, such as brand, size, price, and features, is mapped based on the way the products are placed on the shelves in the store, as shown in the exemplary planogram 605. A shopping consideration set and decision path for each shopper is generated by combining the two datasets. This provides a clear understanding of not only the sequence or the order in which the attributes are considered, but also the cross-comparisons between various product groups. The tree structure is developed through hierarchical clustering of the shopper data. The frequency of cross comparisons determines the grouping of the attributes, and the order of the decisions determines the depth of the nodes in the tree.

Figure 4:
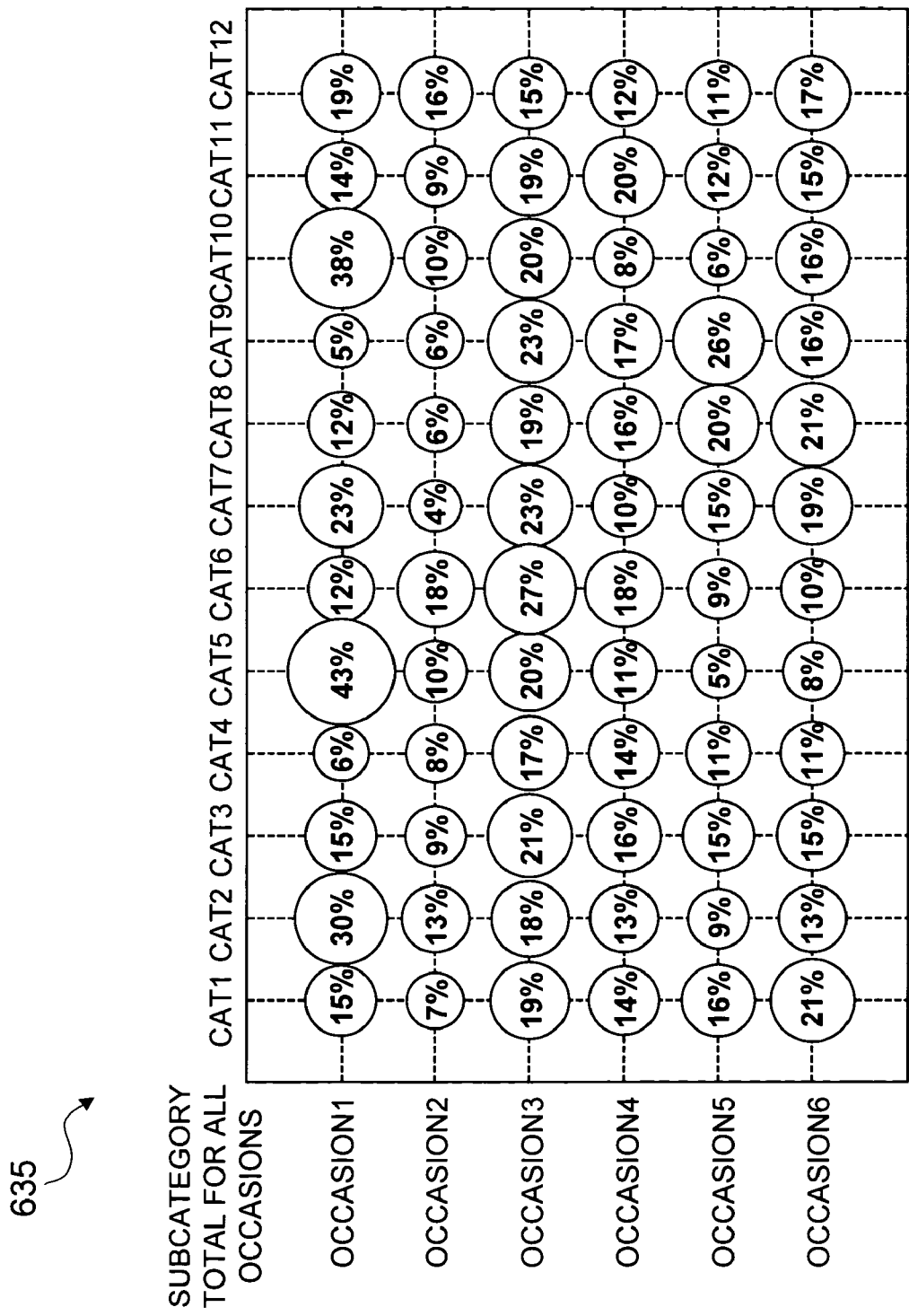
FIG. 4 shows an exemplary process of segmentation based on purchasing behavior.

FIG. 4 shows an exemplary process of segmentation based on purchasing behavior.

This bubble chart 635 illustration in FIG. 4 provides an example where shoppers are segmented based on their trip types and the categories purchased. Each column of the bubble chart represents a product category. The rows represent trip types that are segmented based on occasions. Each number in the chart shows the percent of shoppers of a particular category that belong to a specific occasion, thus helping to understand the contribution of each occasion to a category's sales.

Figure 5A:
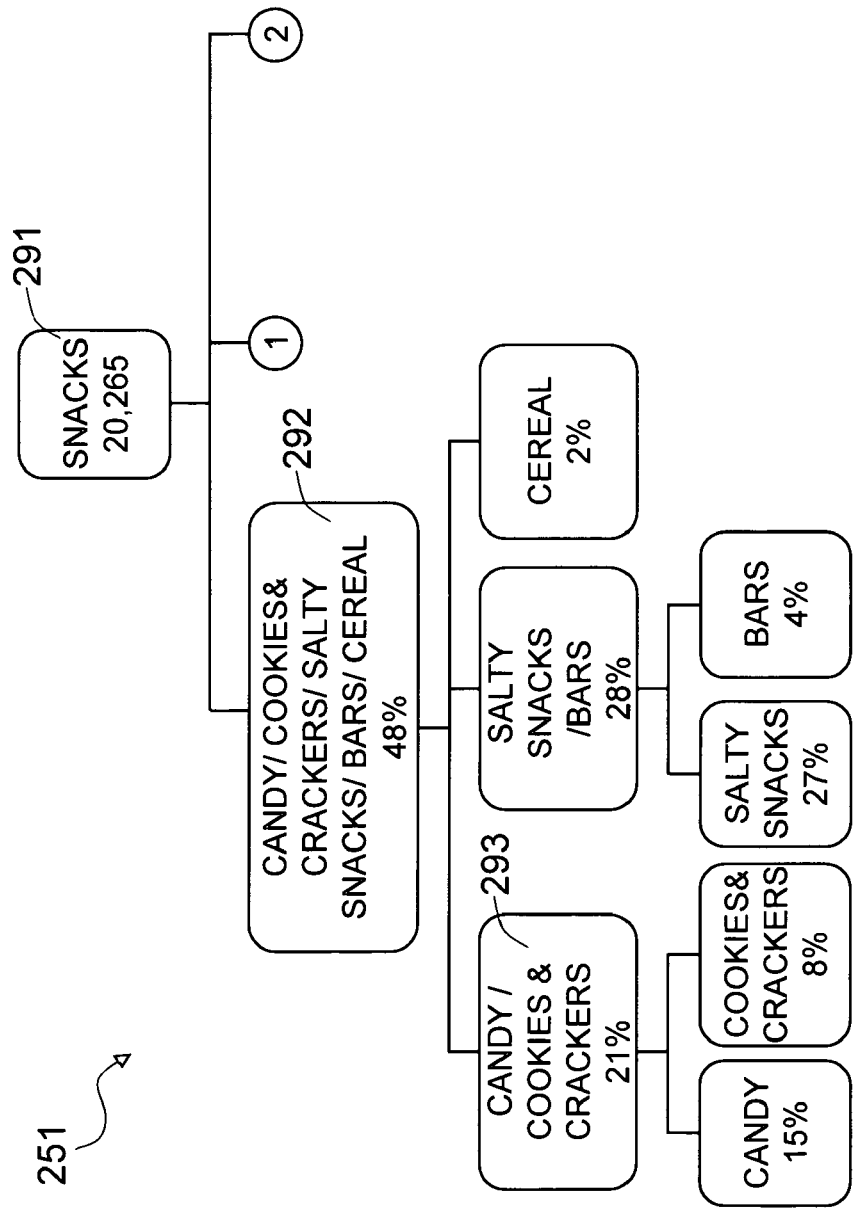
FIG. 5A shows a part of an exemplary decision tree and process of segmentation based on shopping and purchasing behavior.
Figure 5B:
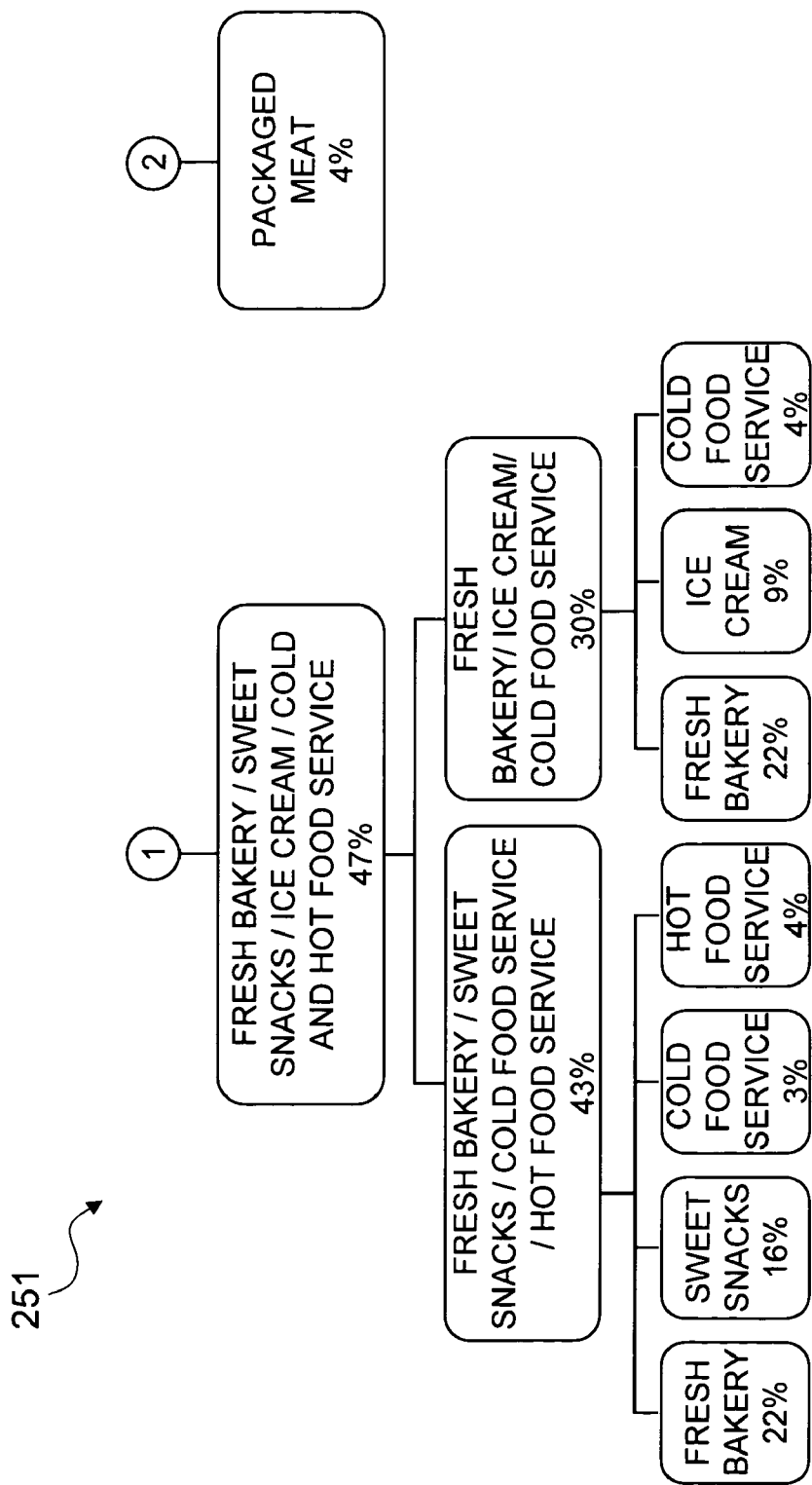
FIG. 5B shows another part of an exemplary decision tree and process of segmentation based on shopping and purchasing behavior.

FIG. 5A and FIG. 5B show an exemplary decision tree and process of segmentation based on shopping and purchasing behavior.

This illustration shows an example where shoppers are segmented based on both their shopping behavior as well as their purchase behavior based on transaction data. Constraints placed on the POS data, e.g., co-occurrence of salty snacks and beverages, helps to identify the "shopper's mission" in the store. Further, in this example, shoppers are segmented by placing constraints on their shopping behavior, like which two categories were shopped together.

Based on the shopper behavior data and the transaction data, the hierarchical decision process for the "Snacks" category is built in this exemplary decision tree. For example, the sub-node "Candy/Cookies & Crackers/Salty Snacks/Bars/Cereal" 292 indicates that these subcategories were shopped or considered together while making a purchase decision. The value representation in the node for "Snacks" 291 shows there are 20,265 snack buyers in this example. Of the 20,265 snack buyers in the node for "Snacks" 291, 48% of the shoppers, i.e., as represented in another node for "Candy/Cookies & Crackers/Salty Snacks/Bars/Cereal" 292, purchased at least one of the subcategories from this group. The percentages for all of the groups in the node for "Candy/Cookies & Crackers/Salty Snacks/Bars/Cereal" 292 may not add up to 100% due to rounding.

Figure 6:
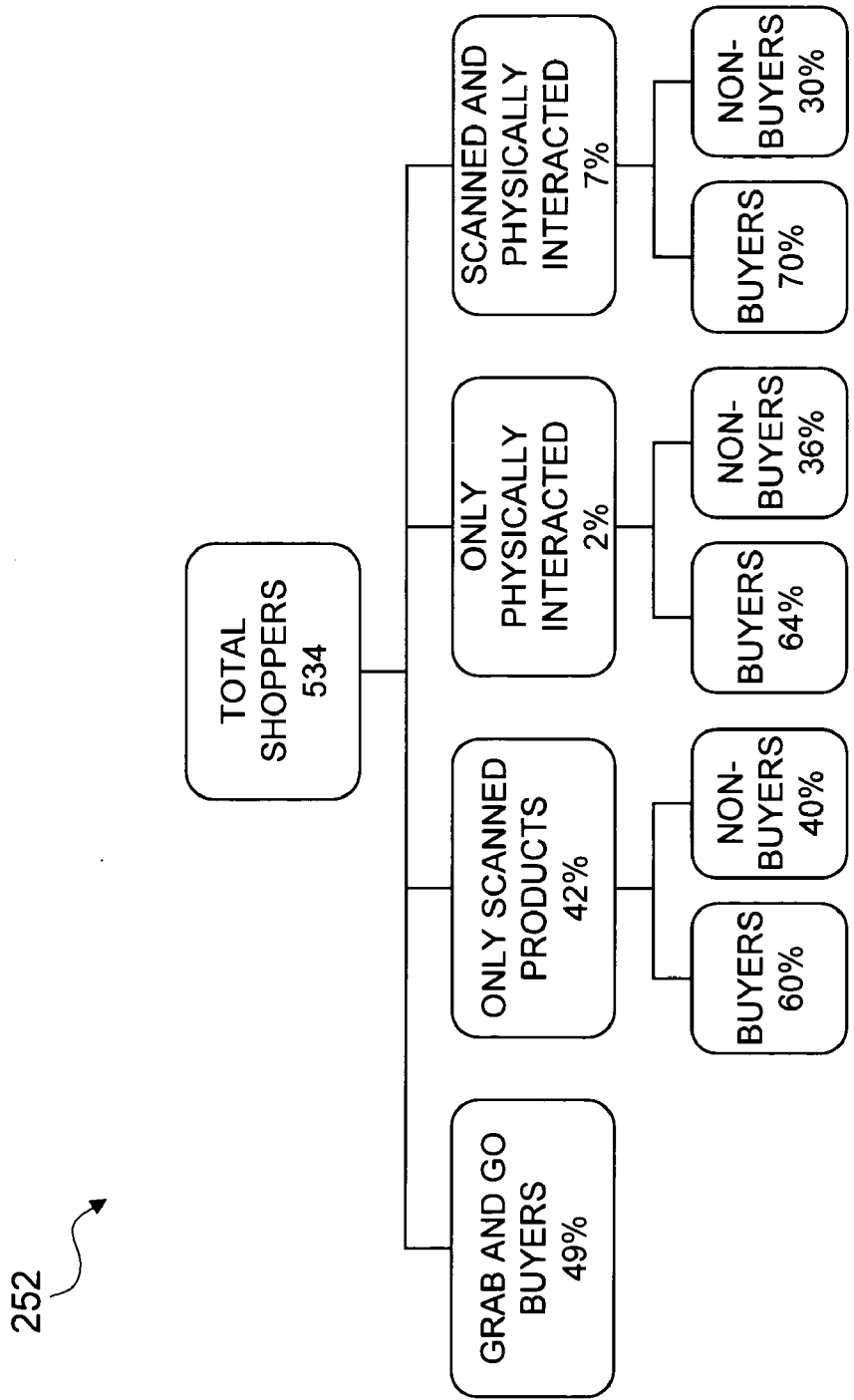
FIG. 6 shows another exemplary decision tree and process of segmentation based on shopping behavior.

FIG. 6 shows another exemplary decision tree 252 and process of segmentation based on shopping behavior.

This illustration shows an example where shoppers are segmented based on their shopping behavior in a category, like "grab and go" and "only scanned products", using automated video analysis along with proprietary advanced data annotation techniques. Such in-depth segmentation provides insights into the nature and complexity of the in-store decision process in a category.

Each shopping behavior is identified based on the application of spatiotemporal criteria to the shopping paths of the shoppers. For example, a set of shopping interaction areas can be predefined for a group of categories. If a shopping path of a shopper stays in the vicinity of a category, the sequence of the coordinates of the path is examined to determine whether they belong to the interaction area of the category, and it is determined whether the shopping path is visiting the associated category. For example, a shopping interaction area can be set with a predefined minimum temporal threshold and a predefined maximum temporal threshold for the shopping interaction types, e.g., "grab and go". If the shopping path of the customer, i.e., the sequence of coordinates in the shopping interaction area, stays for longer than the predefined minimum temporal threshold and less than the predefined maximum temporal threshold for a shopping interaction type, such as the "grab and go", the shopping interaction is classified as the "grab and go" shopping interaction. The temporal thresholds can be decided based on a statistically gathered data in the particular category area, such as the mean temporal value of the particular shopping behavior during a typical period of time.

Figure 7:
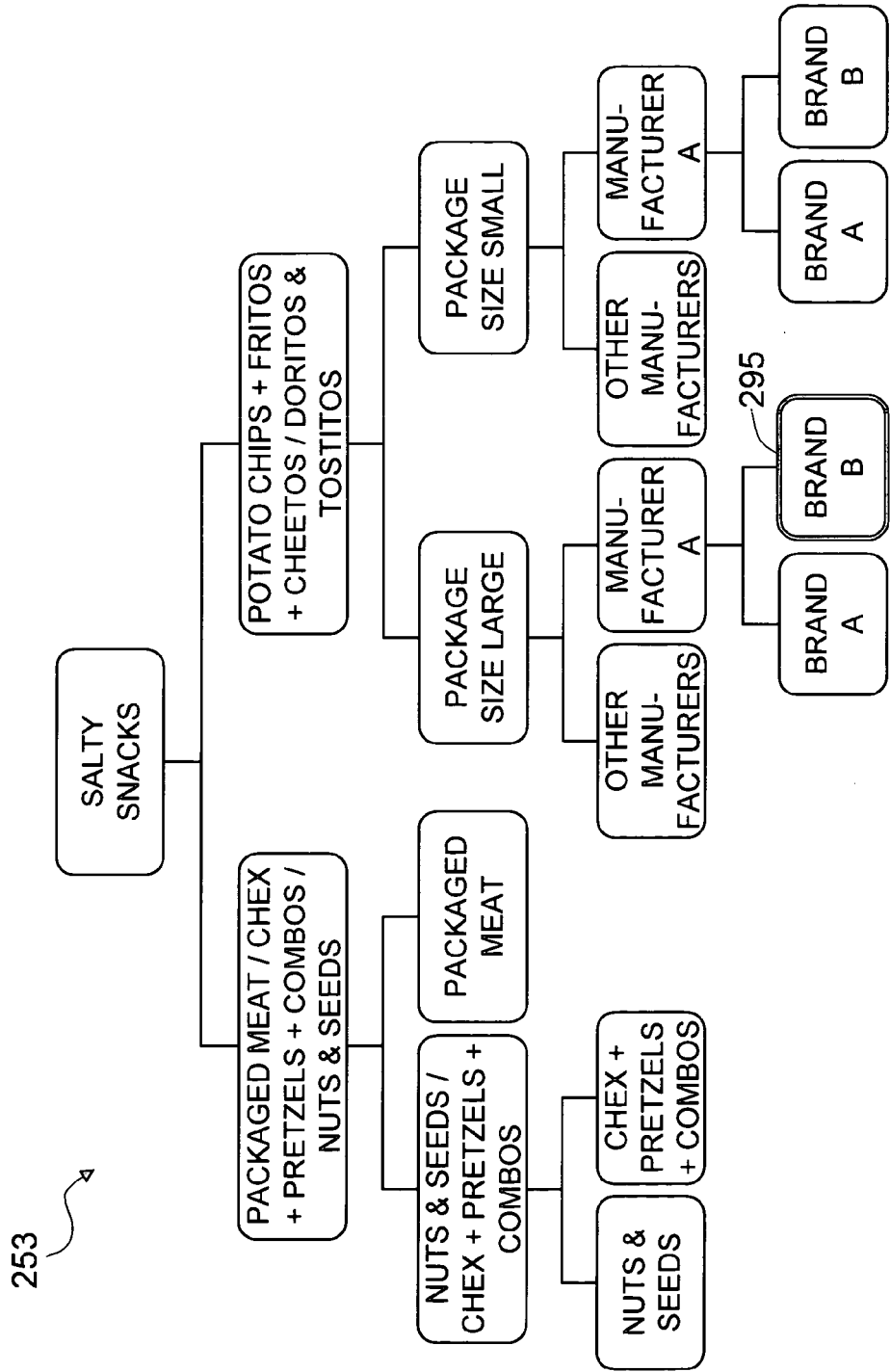
FIG. 7 shows another exemplary decision tree and process of segmentation in consideration of brands.

FIG. 7 shows another exemplary decision tree 253 and process of segmentation in consideration of brands.

The illustration provides a clear example of the importance of product attributes, such as product type and brand, in the decision process of "Salty Snacks". Package sizes are clearly a more important decision over brands for "Potato Chips/Fritos/Cheetos/Doritos and Tostitos". Such in-depth understanding can not only help to modify the category layout to match the decision process of shoppers, but also to increase the number of purchases by providing an improved shopping experience FIG. 8 shows exemplary processes in generating a decision tree based on category correlation in the present invention.

In an exemplary embodiment of the present invention, the process of generating a decision tree consists of:
1) identifying categories in a store area 233,
2) detecting paths of shoppers in the store area 234,
3) measuring stopping sequence of shoppers in the store 235,
4) finding out the correlations when the categories are shopped together 236,
5) ranking the correlations 237, and
6) grouping non-overlapping categories to create a tree based on threshold values for each set of correlations 238.

Figure 8:
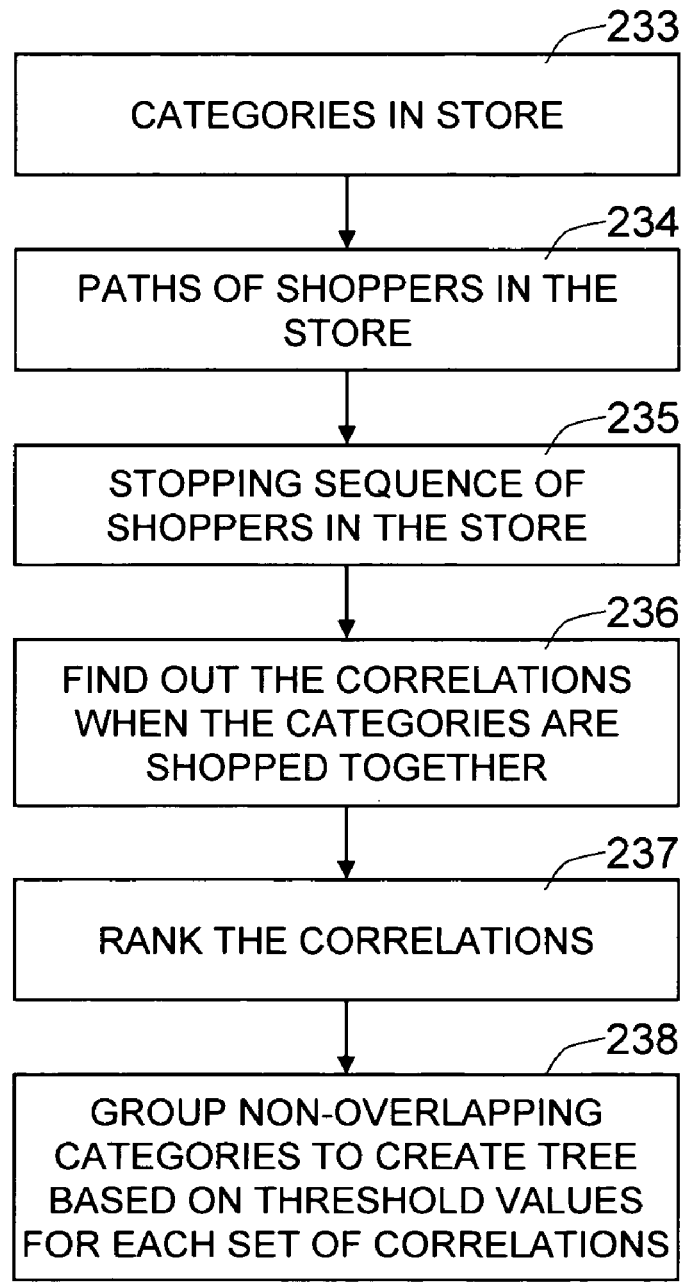
FIG. 8 shows exemplary processes in generating a decision tree based on category correlation in the present invention.

FIG. 9-12 show details of each exemplary process for developing a decision tree, shown in FIG. 8, in the present invention.

FIG. 9 shows exemplary categories and process for detecting the stopping sequences of shoppers in relation to the predefined categories.

In an exemplary embodiment, a store area can be divided into multiple categories based on the regions that are associated with certain types of products. In this example, the shopping behavior analysis can be based on the analysis of the shopping paths of consumers.

For example, categories in a store can be set up as follows: "category A at location L1 represented by polygon 1", "category B at location L2 represented by polygon 2", "category C at location L3 represented by polygon 3", "category D at location L4 represented by polygon 4", "category E at location L5 represented by polygon 5", and so on, as shown in "table 1" 621. Once the target categories are identified, the present invention detects and utilizes the paths of shoppers in the store to measure how the shoppers made the shopping movement: For example, as shown in "table 2" 622, the sequences of coordinates for each shopper, i.e., shopper 1 path—(x11, y11, t1), (x12, y12$m$ t2), . . . , (x1$n$, y1$n$, tn), shopper 2 path—(x21, y21, t1), (x22, y22$m$ t2), . . . , (x2$n$, y2$n$, tn), shopper K path—(xk1, yk1, t1), (xk2, yk2$m$ t2), . . . , (xkn, ykn, tn), and so on, are measured. The sequences of coordinates show in which categories a shopper made the shopping movement. For example, if a shopper stopped and stayed in a category for longer than a predefined temporal threshold, i.e., (xi, yi, ti) is within a category polygon for longer than a temporal threshold, "Threshold$_{Ti}$", the event can be registered as a shopping movement in that category.

Therefore, based on the categories that the shoppers visited, the present invention can detect the stopping sequences of shoppers in relation to the predefined categories. For example, as shown in "table 3" 623, the stopping sequence of shoppers in the store can be as follows: Shopper 1 Sequence—ACEA, Shopper 2 Sequence—CDE, . . . , Shopper K Sequence—AC, and so on.

FIG. 10 shows an exemplary table for correlated stopping sequences of shoppers based on co-occurrences.

From the stopping sequences of the shoppers in the store, the next process is to find out the correlations among the stopping sequences. One exemplary method of finding the correlations is to count the number of co-occurrences and find the relative ratio of the co-occurrences compared to other possible combinations of category co-occurrences, when the categories are shopped together. In the exemplary table, i.e., "table 4" 624, the categories are grouped 4 at a time, 3 at a time, or 2 at a time, when the group of categories appear in the shopping paths of the shoppers. In this example, the percentage of co-occurrences for the group of categories, "ABCD", is 0.01, i.e. 1%, among all other possible combinations of the "4" categories in the measured store area.

FIG. 11 shows an exemplary table for the ranked group of categories based on the correlation.

After the categories are grouped based on a correlation measure, the present invention ranks the group of categories based on the correlation. In the exemplary table, i.e., "table 5" 625, the group of 4 categories are ranked as follows: "ABDE", "ABCE", "BCDE", "ABCD", and "ACDE", in the order of a higher ratio for the co-occurrences.

Figure 12:
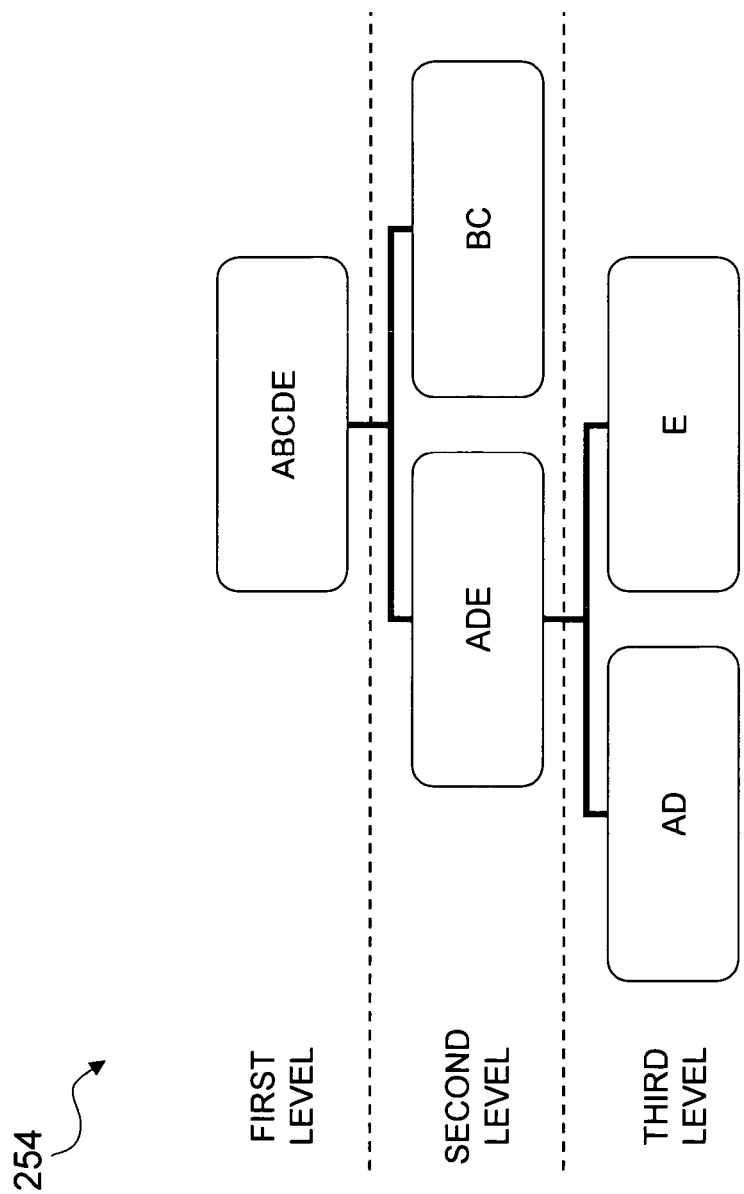
FIG. 12 shows an exemplary decision tree that was constructed after applying a threshold to the correlations of a group of categories.

FIG. 12 shows an exemplary decision tree that was constructed after applying a threshold to the correlations of a group of categories.

In an exemplary embodiment, after ranking the correlations among the grouped categories, the next step is to find non-overlapping categories to create a tree based on threshold values for each set of correlations.

In the exemplary tree 254 shown in FIG. 12, the threshold values can be defined and applied to the table, i.e., "table 5" 625, shown in FIG. 11 as follows:

$$\text{Threshold for 4 categories at a time} = 0.05$$

$$\text{Threshold for 3 categories at a time} = 0.15$$

$$\text{Threshold for 2 categories at a time} = 0.30 \tag{1}$$

The tree starts with a node that shows all of the possible categories initially. According to the definition for the thresholds, there is no valid correlation for 4 categories at a time. However, "ADE" is a valid group from 3 categories at a time, which means it becomes a second level group in the exemplary tree 254. Similarly, "BC" and "AD" are valid correlations from 2 categories at a time. Since "BC" is not part of a top level group from 4 categories or 3 categories at a time, "BC" becomes a second level group, whereas, since "AD" is part of the second level group "ADE", "AD" becomes a third level group under "ADE."

Figure 13:
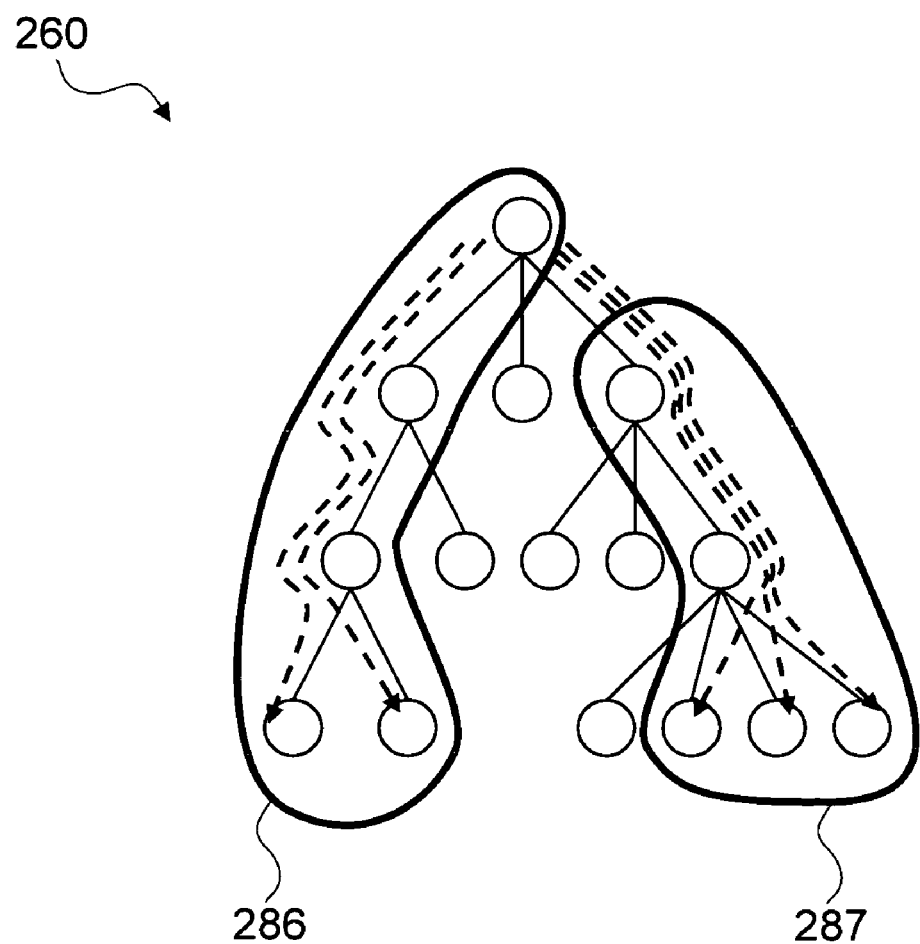
FIG. 13 shows an exemplary grouping of paths in a decision tree in the present invention.

FIG. 13 shows an exemplary grouping of paths in a decision tree in the present invention.

The present invention constructs a hierarchical decision tree structure, e.g. 260, which comprises nodes and edges, based on the observed decision-making. The decision tree is an end-to-end tree in the sense that a set of nodes from the starting node to the ending node shows a sequence of meaningful decision processes as predefined for the measurement area.

In the present invention, the decision tree is an acyclic rooted tree that has the following properties:

$$\text{Any two nodes in the decision tree are connected by a unique simple path, and the number of edges} = \text{number of nodes} - 1. \tag{2}$$

The tree does not need to be a binary tree in the present invention, although a binary tree may be used in many cases. In the exemplary embodiment, the height (i.e., the largest depth) of the tree, the maximum degree (i.e., the number of children) of a node, and the maximum number of nodes in the tree can be predefined based on the type of nodes. For example, the maximum number of nodes in a decision tree can be limited according to the maximum level of interaction and the predefined number of product categories that are used to measure the decision process and are the targets of interest. Similarly, the maximum degree of a node can be dependent on the maximum number of subcategories in an example.

In this example, the maximum number of nodes in the decision tree can be limited by:

$$\text{numOfNodes}_{max} = 1 + n_1 + n_1 n_2 + \ldots + n_1 n_2 \ldots n_1 n_2 \ldots n_{h-1} n_h \tag{3}$$

where "h" is the maximum height of the decision tree, and "$n_i$" is the predefined maximum number of leaves per node at depth "i", where the number of leaves is dependent on the number of attributes for the sub-nodes, such as product sub-categories or product groups, at the node.

The types of nodes can vary, and the nodes are arranged in a particular hierarchy. For example, in an exemplary embodiment, the nodes can represent 1) the shopping behavior or the state-of-mind of the consumer, or 2) the product attributes that are selected by the shoppers.

The number of nodes in a decision tree can also be predefined with a fixed number. An edge represents the transition of the decision.

In an exemplary embodiment, where the nodes represent the shopping behavior or the state-of-mind of the consumer, a purchase action may be located in the nodes at the lowest level of the exemplary decision tree.

In another exemplary embodiment, where the nodes represent the attributes of products, the present invention measures the consumers' hierarchical decision process in a category. Each category consists of several products, which have attributes. As noted earlier, the attributes are defined as a set of product information that comprises brand, product type, size, flavor, and price, in the present invention. The products can be arranged in a particular category layout of attribute blocks, e.g., brand blocks, in the exemplary embodiment. A grid can be used as a basis for an exemplary category layout.

The present invention measures the selection process in the category layout, such as product, brand, and size of product package, based on spatial and temporal observation using video analytics. The decisions can be represented based on the selected or interacted attributes, and decision trees are constructed based on the observed decisions. The decision trees are very useful for retailers to manage categories in an efficient way. The category management comprises planogram/layout design, sku rationalization, assortment of categories, and efficient space allocation.

The count for each of the decisions is increased whenever a shopper makes a decision along the path. If a decision path does not exist in the already existing tree, a new decision path can be constructed by adding or inserting a node to the tree. The insertion process can follow a well-known insertion process for a data structure. For example, a linked list data structure can be used to construct the decision tree, and an insertion of a path can be processed through adding a new pointer to a sub-linked list.

In FIG. 13, certain sets of paths in a decision tree may be grouped together for a deeper understanding of the decision process, e.g., "a set of decision paths 1" 286 and "another set of decision paths 2" 287. For example, a set of multiple outcomes can be grouped based on a time-of-day to find what kinds of decision processes were prevalent during the time-of-day. In this exemplary analysis, the temporal information adds another dimension of understanding the consumer decisions, in addition to the attributes that are already represented in the nodes of the decision tree. Optionally, the decision tree can have a default node for insignificant behavior or no decision, such as passing by activity.

FIG. 14 shows an exemplary scheme of dominant path calculation and level of decision steps calculation.

The consumer decision trees can be made more actionable by quantifying a percentage of shoppers for each node. Conventionally, the consumer decision trees in the prior art used by manufacturers only show the hierarchy and do not quantify a percentage of shoppers at each node. The present invention can calculate which decision was made by the majority of people, based on a large number of gathered samples. The present invention can also calculate a dominant path 289 among the decision paths on the decision tree, although the dominant path 289 may not be the majority. The determination of the majority path and the dominant path 289 can be based on counts of shoppers who took the paths. For example, a voting process can be used to determine a dominant path 289. In the exemplary tree in 261, a dominant path 289 is determined, although the path is not the majority path.

Aggregation of a large number of decision processes shows the statistical decision pattern among the consumers for a particular category or product in the measured location. For example, based on the large number of samples of observed decision processes, it can be calculated which decision was made by the majority of people in the measured space.

The present invention also measures different levels of decision steps that are reflected in the various lengths of the paths in the decision tree. For example, in the case 1 shown in decision tree 262, the path 282 has a longer decision path with more steps than the path 281, which indicates the decision process for the product attribute in the last node, i.e. the leaf, in path 282 took more steps than the decision process for the product attribute in the last node in path 281. In an exemplary embodiment of the present invention, the paths are not required to have the same depth, so the lengths of the decision paths can vary depending on the shopping decision process. However, the largest depth of a decision path will be pre-defined, thus the height of the tree will have a fixed maximum size in this example.

The average time for making a decision can be calculated based on the level of decision steps. The relationship between the shopping time and the decision process can be analyzed. For example, if the average shopping time for a particular sequence of attributes is prolonged compared to other shopping times for other sequences in the decision tree, the components of the particular sequence of attributes may need to be adjusted, depending on the goal for the category to which the attributes belong. The products in the category may be rearranged to shorten the shopping path and facilitate the shopping experience of the consumers, if the reduction of the shopping time is a goal of the store manager in this particular exemplary situation. For example, in the case 2, the products for the revised decision tree 263 have been rearranged from the previous decision tree 262. In the decision tree 263, the path 283 now has the same length of decision steps as the path 281, which indicates the decision steps for the product attribute in the last node in the path 282 in the previous decision tree have been reduced after rearranging the products.

Figure 15:
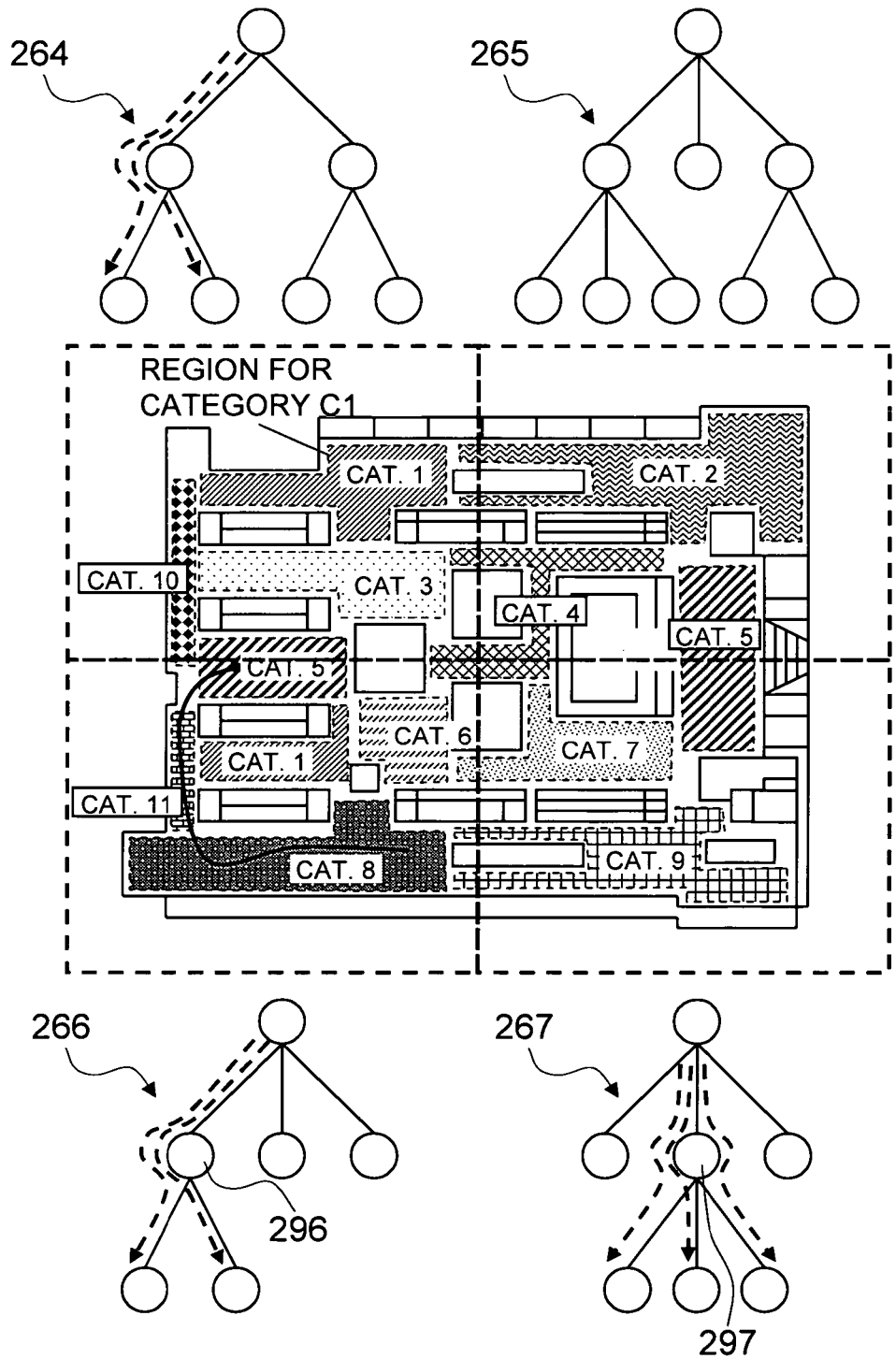
FIG. 15 shows an exemplary scheme of matching a planogram with decision trees.

FIG. 15 shows an exemplary scheme of matching a planogram with decision trees.

The results from the present invention can be used to assist in developing a planogram that matches the decision process of the shoppers as well as their needs. Depending on the planogram, people navigate differently. Therefore, the planogram can be optimized based on the information of the matched decision process. For example, highly-correlated products based on the decision statistics can be placed together in the planogram in an exemplary design. For example, the decision paths in a decision tree 264 could show that two products in the relevant nodes are highly correlated based on a high frequency of the decision processes. In this case, the category layout of the planogram can reflect the correlation by placing the products together, as the correlation can be inferred from the path statistics of the decision tree.

In another example, between two different shelf sets, it can be determined which shelf more closely matches the mindset of consumer, information that can be used for better planogram design. For example, the pattern of the decision paths in a decision tree 266 is different from the pattern of the decision paths in another decision tree 267 in comparing two different shelf sets. The middle node 297 at depth 1 in the decision tree 267 shows "degree 3", i.e., three children, while the leftmost node 296 in the decision tree 266 shows "degree 2", i.e., two children. This indicates that the shoppers make the shopping decision for the three products in the shelf that is associated with the decision tree 267 while they make the shopping decision for the two products in the other shelf that is associated with the decision tree 266. Given the information, the store manager can assess which planogram design is more suitable for the goal of the two shelf sets that are associated with the decision trees. The results also help in developing product assortments, based on an understanding of the hierarchy of category decisions, and ensuring the proper allocation of space. In another exemplary application of the results, the present invention superimposes price elasticity on behavior, based on point-of-sale data from several price points. Price elasticity of demand is the measure of the sensitivity of quantity demanded in relation to changes in price. In other words, it is a measure of how shoppers react to change in price while purchasing a product.

The present invention takes into account a longer time period that involves several price points for the category, in order to normalize the impact of price promotions on shopper behavior. The longer time period will help to neutralize the impact of price promotions, in an attempt to provide a clear understanding of the importance of all other product attributes, like flavor and package size, in the purchase decision process for the category.

Figure 16:
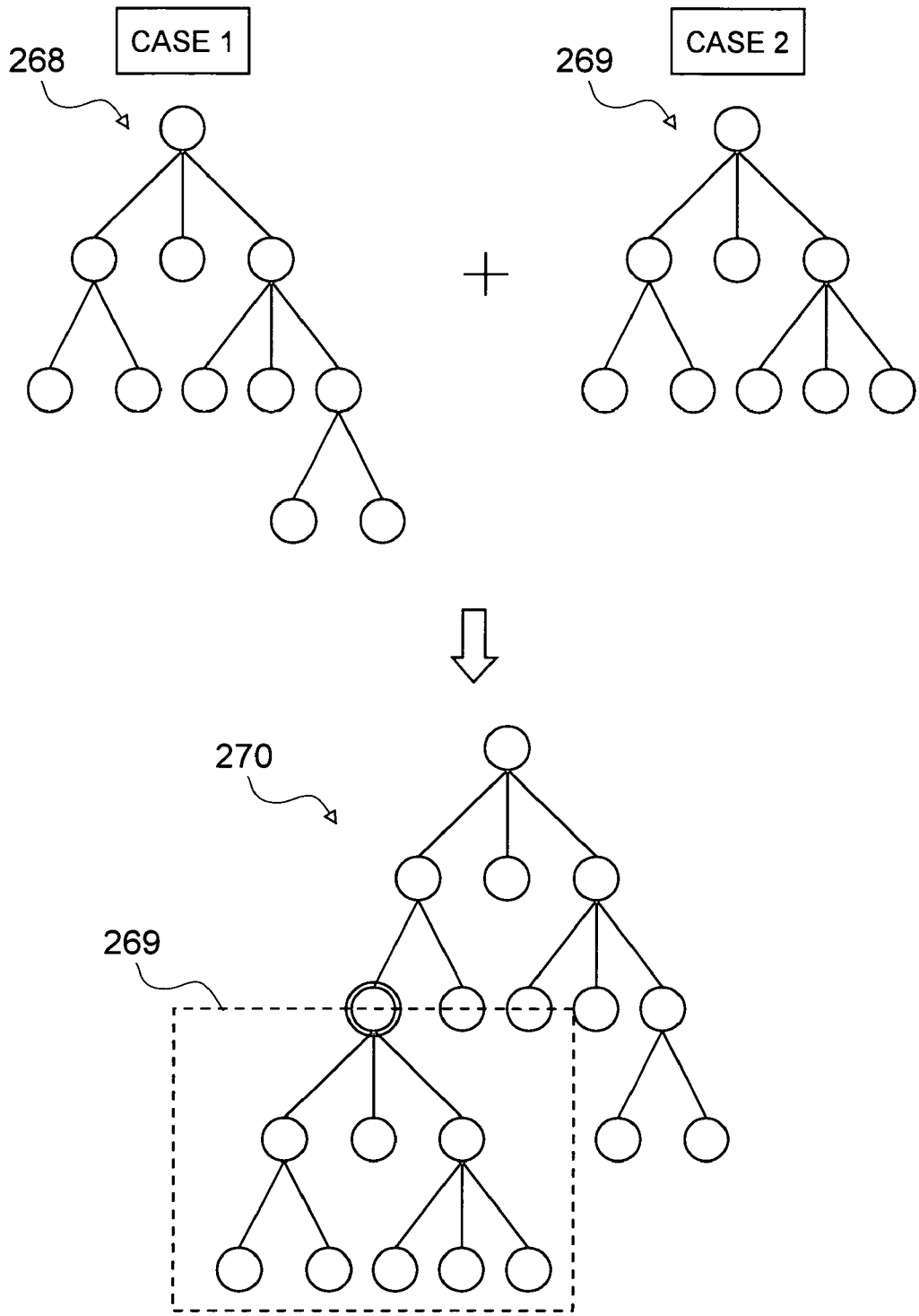
FIG. 16 shows an exemplary scheme for the decision tree merge process.

FIG. 16 shows an exemplary scheme for the decision tree merge process.

In an exemplary embodiment of the present invention, multiple decision trees can be grouped together or merged, in order to analyze the decision process from a different perspective. For example, multiple decision trees can be constructed for different times-of-day for the target location for the consumer decision observation over a predefined period of time. Then, the results of multiple trees can be merged to show the overall decision processes of the consumers during the period.

In another example, one or more sub-trees can be constructed for the decision paths in subcategories. The one or more sub-trees, e.g., 268 and 269, can be integrated into the super-tree, e.g., 270, for the higher level category. This process is useful when there are many category levels, and each category itself contains highly-complicated subcategories. In essence, this is a "divide-and-conquer" strategy to divide a category into multiple subcategories, construct the decision trees for the subcategories, and merge them later for a complete view of the decision process in the category.

Figure 17:
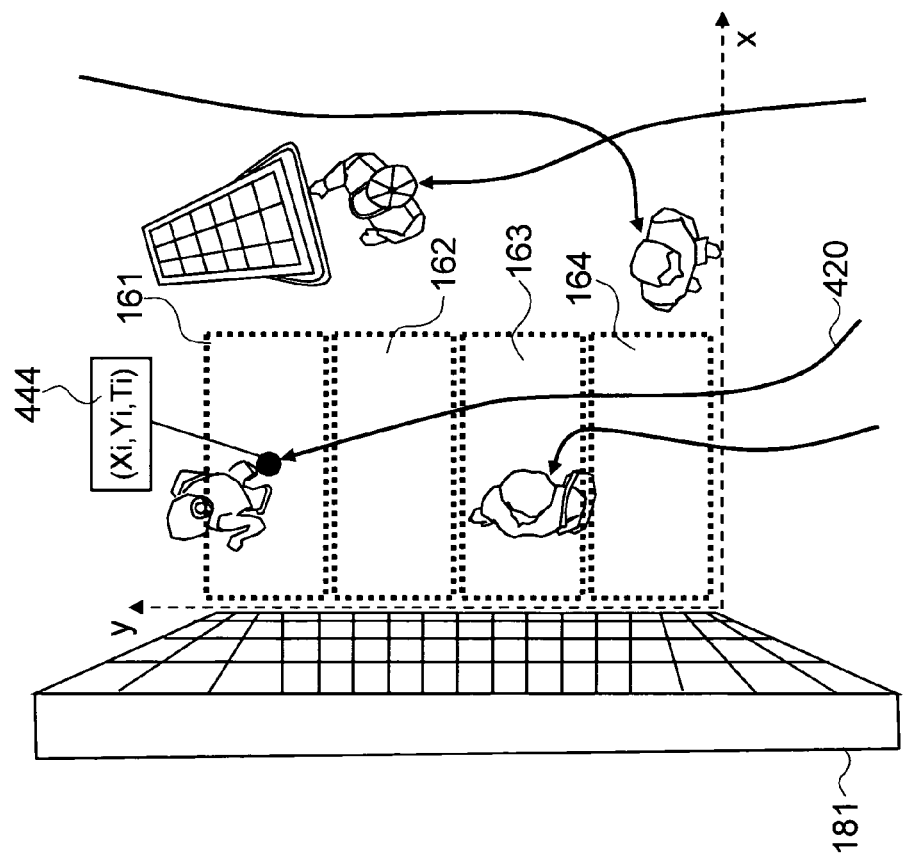
FIG. 17 shows an exemplary view from a top-down camera, where the shoppers' movements through a store area are observed based on the tracking information.

FIG. 17 shows an exemplary view from a top-down camera, where the shoppers' movements through a store area are observed based on the tracking information.

The first stop count and measurement for the duration of dwell time can be used for analyzing the shoppers' shopping movements. A floor coordinate system is devised in the present invention. For example, a (x, y) coordinate system can be applied to a target store area, such as an area adjacent to a shelf 181. The area can be further divided into a set of sub-areas that are associated with the categories.

In the exemplary embodiment shown in FIG. 17, the present invention analyzes the input images from the top-down means for capturing images, and increases the traffic count for the category in which the associated area is visited by the shoppers in the first-stop detection process. For example, in the exemplary embodiment, a "physical space bounding box for category 1" 161, a "physical space bounding box for category 2" 162, a "physical space bounding box for category 3" 163, and a "physical space bounding box for category 4" 164 are predefined, and the present invention processes tracking 420 of each person in the vicinity of a category. If the coordinate, i.e., (Xi,Yi,Ti) 444, of a person stays in one of the bounding boxes for longer than a threshold time as a first-stop, the present invention increases the traffic count for the first-stop detection of the category that is associated with the particular bounding box.

Furthermore, another set of thresholds can be utilized for a different type of shopping behavior. For example, a pair of temporal thresholds, i.e., a lower limit and an upper limit, can be set up for a certain type of interaction behavior with a product. If the coordinate, i.e., (Xi,Yi,Ti) 444, of the person stays in one of the bounding boxes for longer than a lower limit threshold time and less than or equal to an upper limit threshold time, the present invention increases the count for the interaction with a product of the category that is associated with the particular bounding box.

One or more top-down view first means for capturing images is installed in such a way that their fields-of-view can cover the predefined physical space bounding boxes. For the simplicity of explanation, one physical space bounding box is assigned to each vertical column, called "category block," of the shelf space, and it is assumed that one category is associated with each of the physical space bounding boxes per the vertical column in the exemplary embodiment in FIG. 17. However, there can be multiple categories in one vertical column of the shelf space, and the present invention can resolve the situation of multiple categories in one column of the shelf space in coordination with using the frontal-view images from the second means for capturing images. The frontal-view images provide information about which category the shopper intended to make the first-stop, e.g., viewership information about the specific category that the shopper looked at for certain duration of time, thus correctly increasing correct first-stop counter. An example of using the frontal-view images from the second means for capturing images, along with hand tracking to detect the interaction of a shopper, will be shown later. In addition, a semi-automatic method can also be used to resolve the situation of multiple categories in one column of the shelf space.

Figure 18:
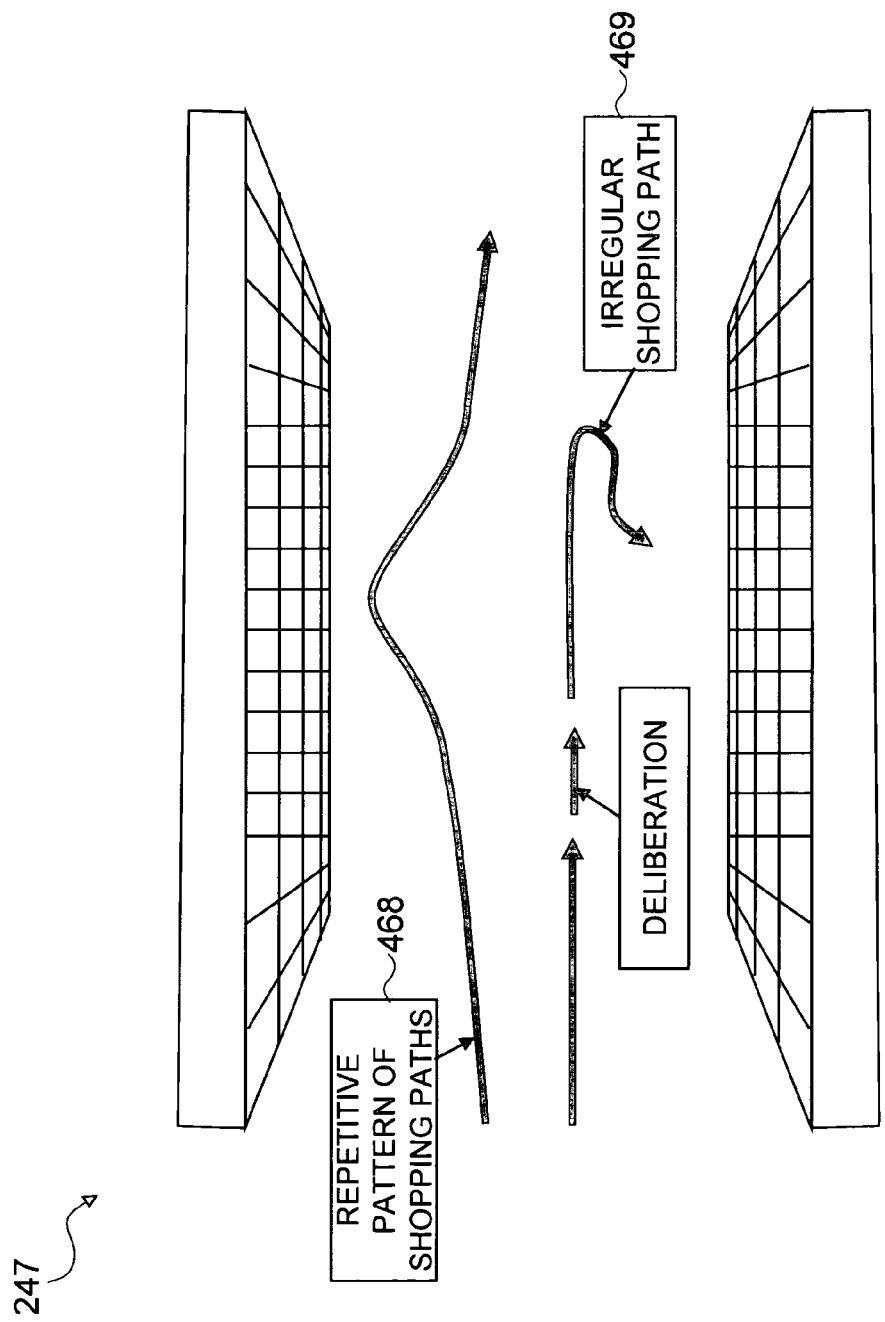
FIG. 18 shows an exemplary application of spatiotemporal criteria that can be used to differentiate between a premeditated purchase and an impulse purchase.

FIG. 18 shows an exemplary application of spatiotemporal criteria that can be used to differentiate between a premeditated purchase and an impulse purchase 247.

The present invention measures a premeditated decision compared to impulse or extemporaneous decision, based on the observation of the outlier behavior pattern in the decision tree. For example, consumers who frequently purchase from a product category in a particular store become more knowledgeable about the location of products in the category, i.e., develop familiarity with the category layout. Also, if they are loyal to a particular brand/product type within the category, their decision process in the store is very quick. Therefore, their shopping activity and path could show a repetitive pattern of the decision-making process for the particular product category compared to other product categories. FIG. 6 shows an example of a decision tree that identifies premeditated and impulse purchase decisions, based on the in-store behavior of consumers. The accumulation of the decision processes, and accordingly the corresponding decision paths in the decision tree, for the particular product category can be classified as a norm, i.e., a premeditated decision pattern. For example, the repetitive pattern of shopping (trip) paths 468 can be regarded as the norm for the decision paths. Any irregular and occasional decision pattern and the corresponding irregular shopping path, e.g., 469, which is outside of the norm, may be regarded as an impulse or extemporaneous decision.

Figure 19:
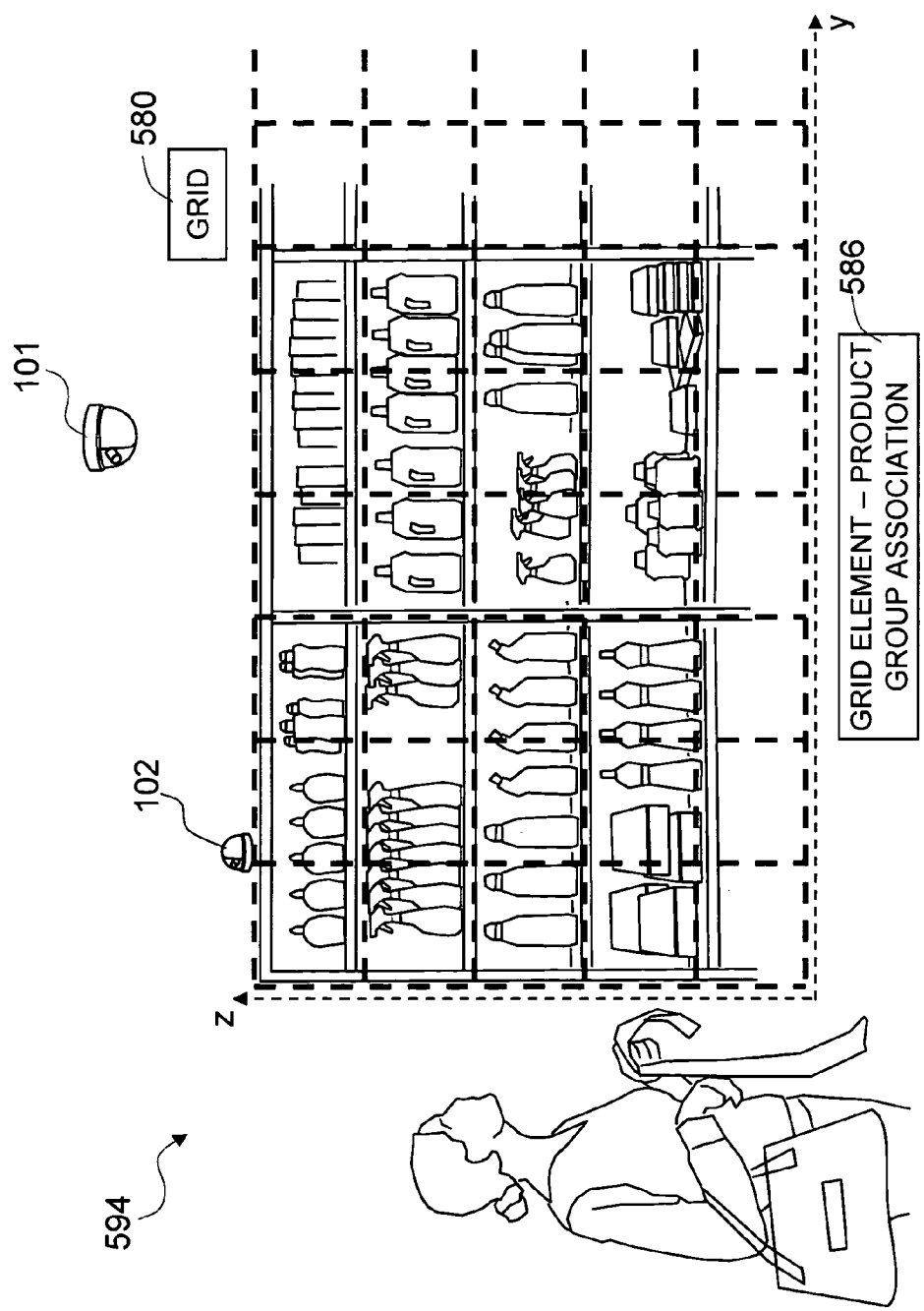
FIG. 19 shows an exemplary grid structure in the present invention.

FIG. 19 shows an exemplary grid structure and processing 594 in the present invention.

Shopping decisions can be determined based on the observation of:

1) the first-stop the shoppers made and the associated product sale data, or 2) the shoppers' interaction with the products and the associated product sale data.

With regard to the shopper's interaction with the products, the present invention organizes products in a coordinate system, e.g., (y, z) coordinates, according to predefined attributes for the products. Examples of attributes comprise brand, product type, size, flavor, and price. The products with the same attribute can be grouped as a product group, forming a product attribute block. A grid 580 structure is constructed on top of the coordinate system, and an attribute of a product group is mapped to at least a grid element by associating the grid element with the product group and its attribute 586. When the grid elements are mapped to product attribute blocks, the size of each grid element is adjusted according to the size of the shelf space and the product size. The mapping of the grid elements to product attribute blocks does not have to be one-to-one mapping. Multiple grid elements can be associated with a product group when the occupied space by the product group requires more than one grid element. When consumers make decisions and interaction movements, the present invention measures which attributes in the attribute block are chosen.

The present invention also measures the sequence of the chosen attributes as a sequence of decisions that are made by a consumer. The sequences of decisions made by a group of consumers are accumulated over a period of time to construct the decision tree for the group of people during the time period. The sequence of decisions is a decision path from a node to the next node, and a sequence of decisions at this level shows the end-to-end decisions made by a consumer. One of the core benefits of the present invention is the ability to infer the sequence of decisions from the sequence of attributes for the products with which the consumer interacts in an arrangement of attributes, based on the video analytics.

Figure 20:
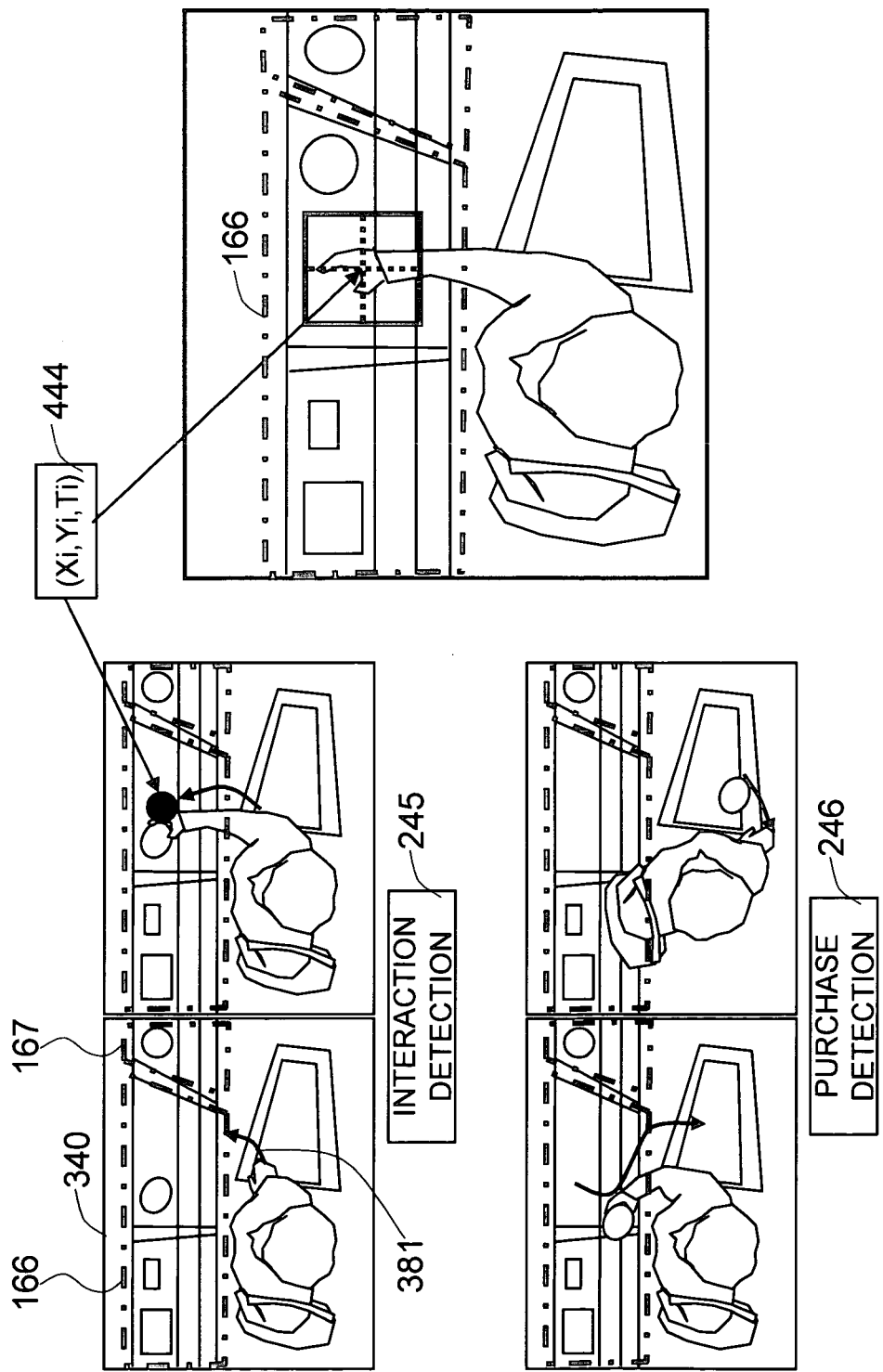
FIG. 20 shows exemplary interaction and purchase detection based on the grid structure in the present invention.

FIG. 20 shows an exemplary interaction and purchase detection based on the grid structure viewed from a top-down means for capturing images in the present invention.

In the exemplary embodiment, the present invention analyzes the input images from the top-down means for capturing images, and increases the interaction count if the shopper interacts with a product in the category at the interaction detection 245 process. The present invention also increases the purchase count for the category, if the shopper makes a purchase at the purchase detection process 246.

For example, in the exemplary embodiment, a "shelf space bounding box for category 1" 166 and a "shelf space bounding box for category 2" 167 are predefined in the camera view 340, and the present invention detects and tracks the hand movement 381 of the shopper. If the coordinate, i.e., (Xi,Yi,Ti) 444, of the person stays in one of the bounding boxes for longer than a threshold time, the present invention increases the interaction count of the category that is associated with the particular bounding box. Multiple thresholds can also be used to further differentiate the level of engagement.

The purchase detection 246 process can utilize a background subtraction algorithm in the bounding boxes to detect the presence and absence of the product belonging to a category. When a product's absence is detected, the purchase count is increased for the particular product category. In addition, a semi-automatic annotation method can also be used for the purchase detection 246 process.

Figure 21:
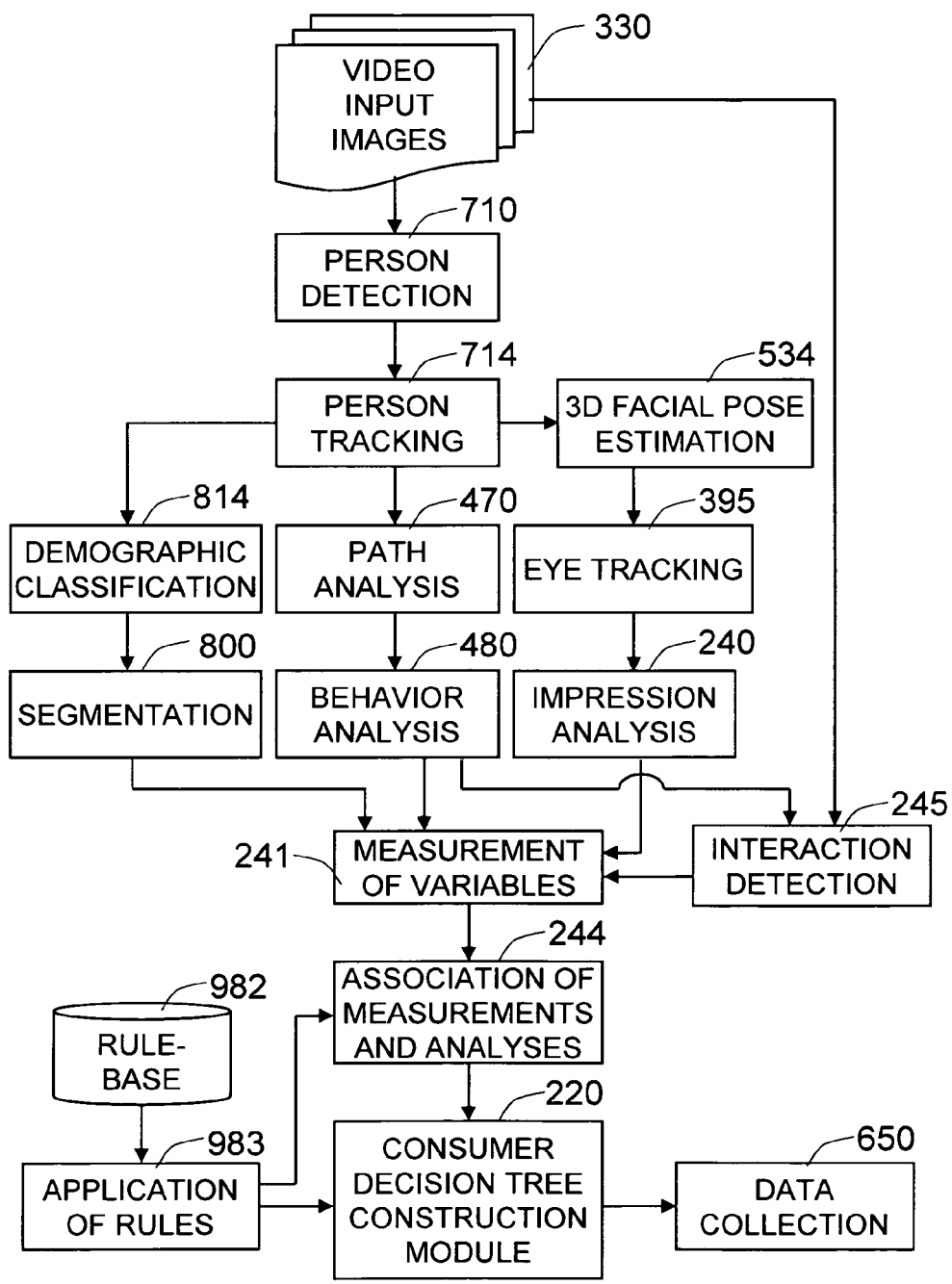
FIG. 21 shows exemplary processes for the measurement of people's shopping decisions with regard to product categories, in which computer vision-based behavior analysis and segmentation measurement, i.e., demographics measurement and impression analysis, are associated in an exemplary embodiment of the invention.

FIG. 21 shows exemplary processes for the measurement of people's shopping decisions with regard to product categories, in which computer vision-based behavior analysis and segmentation measurement, i.e., demographics measurement and impression analysis, are associated in an exemplary embodiment of the invention.

The present invention comprises modules of:
automatic behavior measurement and analysis,
automatic demographics measurement and analysis,
impression analysis,
semi-automatic data measurement and analysis, and
a module for associating the measurements and analyses.

The present invention identifies various variables for the interaction stages of the person with regard to a set of product categories, as observed decision processes in a store area. The variables can include behavioral measurement, segment information, such as demographics, and impression level. The variables show which sequences of nodes or decision paths the shoppers made during a measurement period.

In a preferred embodiment, the present invention processes the video-based analysis automatically. However, in another exemplary embodiment, the present invention can process the video-based analysis semi-automatically, where a semi-automatic annotation tool is used in combination with automatic behavior analysis, demographic analysis, and impression analysis. The present invention can utilize an efficient video annotation tool, such as that disclosed in U.S. patent application Ser. No. 12/011,385 of Sharma, et al. (hereinafter Sharma Ser. No. 12/011,385), as the semi-automatic annotation tool.

Furthermore, the present invention can organize the sequence of decision paths in relation to each demographic segment. The demographic segments include age range, gender, and ethnicity, and the demographic segmentation can be used to identify any typical shopping pattern of specific shopper segments, if they exist. The present invention can also organize the measurement of decision patterns based on other segmentation approaches, such as trip type analysis of the people. The trip type includes shopping patterns of the people. Further, the present invention can evaluate the engagement process of the person with each category, in granular detail, in an exemplary embodiment. The granular detail comprises the behavior of reading labels, comparing products, sniffing products, and other physical interactions with the products. However, although any type of interaction behavior may be considered for the decision process, the primary behavior is the purchase behavior of the shoppers in the present invention. Therefore, the shoppers' purchase behaviors in association with the product attributes are primarily measured and used to construct the decision tree.

Figure 22:
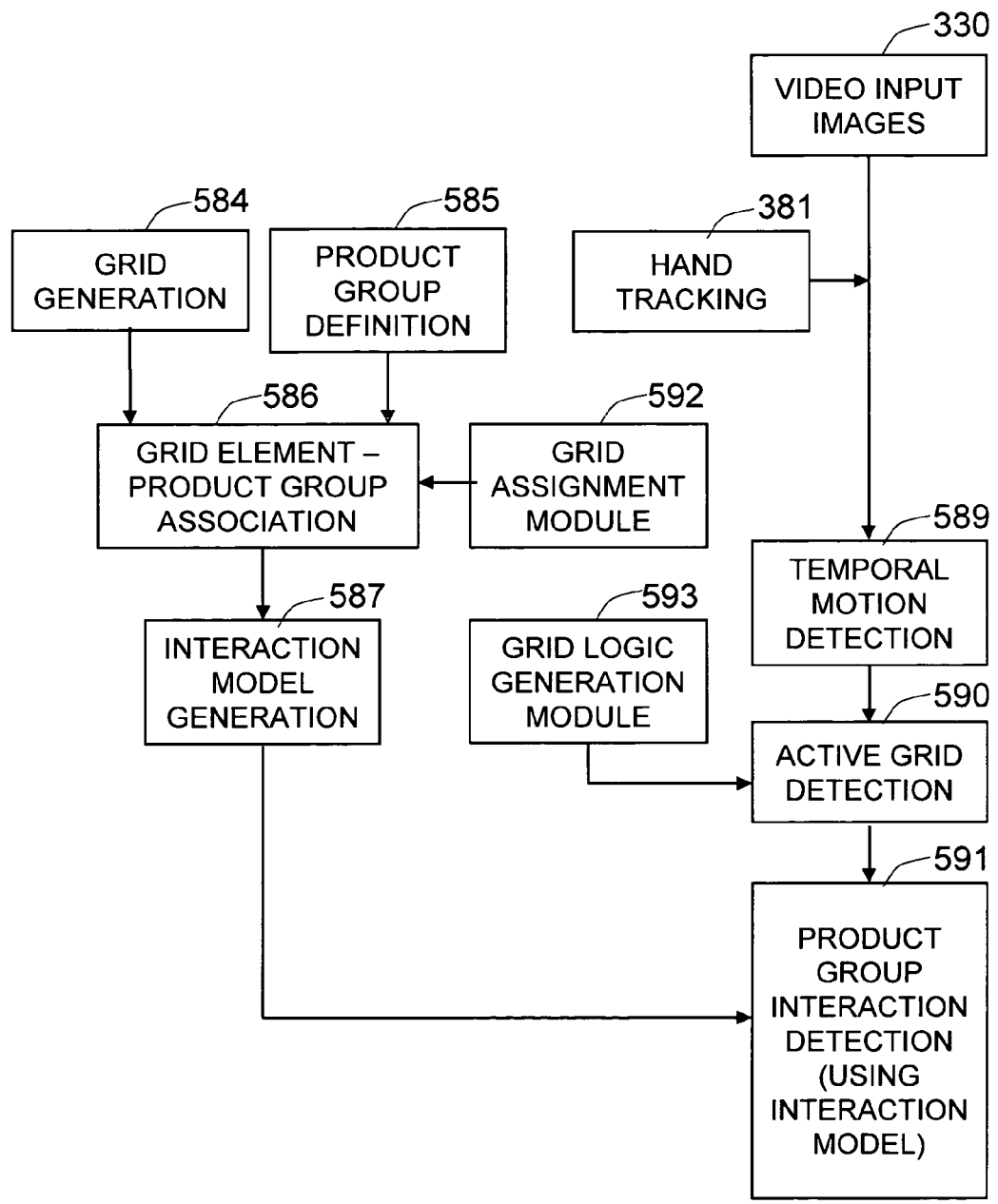
FIG. 22 shows an exemplary setup phase and interaction detection process for the subcategories in a category, where the subcategories are defined at the product group level.

In the exemplary embodiment shown in FIG. 21, the present invention detects 710 and tracks 714 a person, such as a consumer, in the video input images 330 from a plurality of means for capturing images 100. The present invention can join the trajectories of the person tracks from a video of a means for capturing images 100 to another video of a means for capturing images 100 while the person appears and disappears between the fields-of-view among a plurality of means for capturing images 100. Based on the tracking information, the present invention performs the path analysis 470 of the particular person. The path analysis 470 can be used as one of the ways to process the behavior analysis 480 of a person and obtain useful information about the person's behavior, such as engagement behavior with a product. The interaction of the consumers 245 is also detected based on the behavior analysis as discussed above with regard to FIG. 20. FIG. 22 also discusses details of an exemplary interaction detection 245 process.

The present invention can utilize any reliable video-based tracking method for a single consumer and a group of consumers in the prior art, with regard to the behavior analysis. For example, U.S. patent application Ser. No. 12/215,877 of Sharma, et al., (hereinafter Sharma Ser. No. 12/215,877) disclosed an exemplary process of video-based tracking and behavior analysis for people in a physical space based on the information for the trip of the people, using multiple means for capturing images in a preferred embodiment of the invention.

The present invention can also process segmentation 800 of the people, based on the images of the people in the video. Demographic classification 814 is an exemplary segmentation 800 of the people.

The present invention can utilize any reliable demographic composition measurement method in the prior art as an exemplary video-based segmentation of the people. For example, U.S. patent application Ser. No. 11/805,321 of Sharma, et al., (hereinafter Sharma Ser. No. 11/805,321) disclosed an exemplary demographic composition measurement based on gender and ethnicity.

The segmentation 800 and behavior analysis 480 data are used to calculate the values for the predefined variables 241, such as the first-stop counter and the demographic class counter. The measurements are sent to the module for the association of measurements and analyses 244. The consumer decision tree construction module 220 constructs a consumer decision tree (CDT) based on the measurements and analyses. The tree construction and tree management processes, such as insertion and deletion of nodes, follow the well-known data structure management processes in the practiced art.

In another exemplary embodiment, impression analysis 240 can be carried on images of the people for measurement as a part of the behavior pattern of the shoppers while making shopping decisions. The impression measurement module counts and measures the impression length. The impression measurement module can also process a deeper impression analysis in correlation with other parameters, such as the duration of viewing time for a particular product category per demographic segmentation. With regard to the impression count and measurement, the present invention can utilize any well-known impression measurement method. U.S. patent application Ser. No. 11/818,554 of Sharma, et al., (hereinafter Sharma Ser. No. 11/818,554) disclosed details of a system for measuring the impression level through the viewership of people. An exemplary embodiment of the present invention can utilize Sharma Ser. No. 11/818,554 for the impression measurement in the impression analysis 240, especially utilizing the 3D facial pose estimation 534.

In an exemplary embodiment, the impression analysis 240 module can also utilize other variables to measure the deeper level of impression. The other variables can comprise the relationship of the category with the surrounding categories, demographic segmentation, and temporal attributes. For example, a more than average number of impression counts for a category in relation to a specific demographic group may indicate that the category had an unusual influence in the decision-making process by the specific demographic group in a particularly meaningful pattern. Likewise, the impression count data can be analyzed to measure the impact on the decision-making process by each predefined demographic group in relation to the particular category.

The measured data and constructed decision tree can be stored in a database at the data collection process 650. The analysis of the measured data can be further facilitated by applying 983 a set of predefined rules in a rule base 982.

Rule Application Logic Module

In the present invention, the analysis of the measured data can be further facilitated by applying 983 a set of predefined rules for the decision tree construction in a rule base 982 through a rule application logic module. The rule application logic module can enable a dynamic rule application, rather than relying on an ad hoc solution or static hard-code in translating the measured data.

An exemplary rule application logic module can be implemented utilizing the information unit verification technologies in U.S. patent application Ser. No. 11/999,649 of Jung, et al. (hereinafter Jung Ser. No. 11/999,649).

The rule application logic module enables the adjustment in the analysis of shopping decision measurement, the construction of the decision tree, and processes related to the decision tree, to be done in a structured and dynamic way. The exemplary analysis formula and statistical model can be dynamically adjusted based on the rule application logic module.

The rule application logic module can further construct the criteria based on a combination of a set of predefined rules, in which the analysis of the data can be performed in further detail. The rule application logic module can further define domain-specific criteria for the decision tree construction. The rule application logic module can facilitate the process of producing a unified and standardized decision tree construction, by normalizing the variance within the predefined thresholds. For example, if a measurement is skewed due to less desirable environmental factors, the differences can be adjusted by applying normalization offset values to the differences within predefined thresholds using the rule application logic module. Then, the analysis can take this into consideration at the final analysis of the decision tree construction.

The application of the rule application logic module can differentiate the levels of measurement and analysis of the decision tree construction, where a first set of criteria is applied throughout the preliminary data, and a second set of criteria is applied to the next level of data for a complicated analysis, in order to serve the specific needs of the complicated analysis. An exemplary first set of criteria can typically comprise common criteria throughout all of the data, and the second set of criteria is typically different from the first set of criteria.

FIG. 22 shows an exemplary setup phase and interaction detection process for the subcategories in a category, where the subcategories are defined at the product group level.

In an exemplary embodiment, an exemplary category can be divided into subcategories in association with the product groups on shelves in a category, based on the product group definition. In this example, the shopping behavior analysis relies on the consumers' interactions with the product groups on shelves and the association of the product group with the grid element, such as the "grid element—product group association" 586 in FIG. 19. As discussed, the products in product groups can be grouped based on the same kind of predefined attributes.

In this exemplary embodiment, the present invention may use a plurality of first means for capturing images to detect the consumers' presence in the vicinity of a plurality of subcategories, defined at the product group level, i.e., based on the attributes. Then, the present invention may use a plurality of second means for capturing images to detect the consumers' shopping interaction with the product groups in association with the subcategories on shelves.

An exemplary setup phase and interaction detection 245 process for the subcategories, i.e., product groups, is discussed as follows. Product group interaction detection is achieved by building a model through an interaction model generation 587 process, during the setup phase, and using output from computer vision algorithms in conjunction with that model to detect the interaction of any consumer with any defined product group, such as the product group definition 585.

During the setup phase, a polygon is drawn around the shelf or shelves of interest. The grid generation 584 module then divides the region into logical grid elements in a grid 580 by taking the perspective distortion due to the camera view into account. In an exemplary embodiment, the grid elements can have IDs, i.e., grid element IDs, which start at a certain number, such as zero or one, on the top left corner, and progressively scan the grid elements till the bottom right. During the setup phase, regions on the shelf that make up a product group are marked by drawing polygons around the corresponding regions.

Once this is done, the grid assignment module 592 matches all of the grid elements that match each product group by checking for intersection of the grid element with the regions. Then, the grid logic generation module 593 uses the perspective projection of the camera and generates a look up table for deciding which region to pick when more than one grid element is active. Active grid elements are those that have temporal motion in them. When more than one grid element is active, the grid element IDs are arranged in increasing order, and the lowest ID is used to look up the region to select.

Once the setup is finished, the video from the camera is processed by a module that detects temporal motion, such as the temporal motion detection 589, at every pixel in the image. The grid elements that have a minimum threshold of pixel with motion are marked as active grid elements at the active grid detection 590 process. The look up logic module is used to determine which region is being interacted with to find the right product group at the product group interaction detection 591 process.

The temporal motion can be calculated based on a frame differencing method. In another exemplary embodiment, any reliable hand tracking 381 method can also replace the temporal motion detection for detecting the interaction of the consumers with the grid elements for a category, i.e., a product group.

Based on the described processes for the product group interaction detection process for a product group above, the present invention can detect a plurality of interactions of consumers with subcategories in the category, especially at the product group level, and the accumulated detection data can provide important information for the category analyses that are described above.

In another exemplary embodiment, an exemplary category can be further divided into multiple subcategories based on the sub-regions that are associated with certain types of the products in the sub-regions in the category. In this example, the shopping behavior analysis can be based on the path analysis of the consumers.

Figure 23:
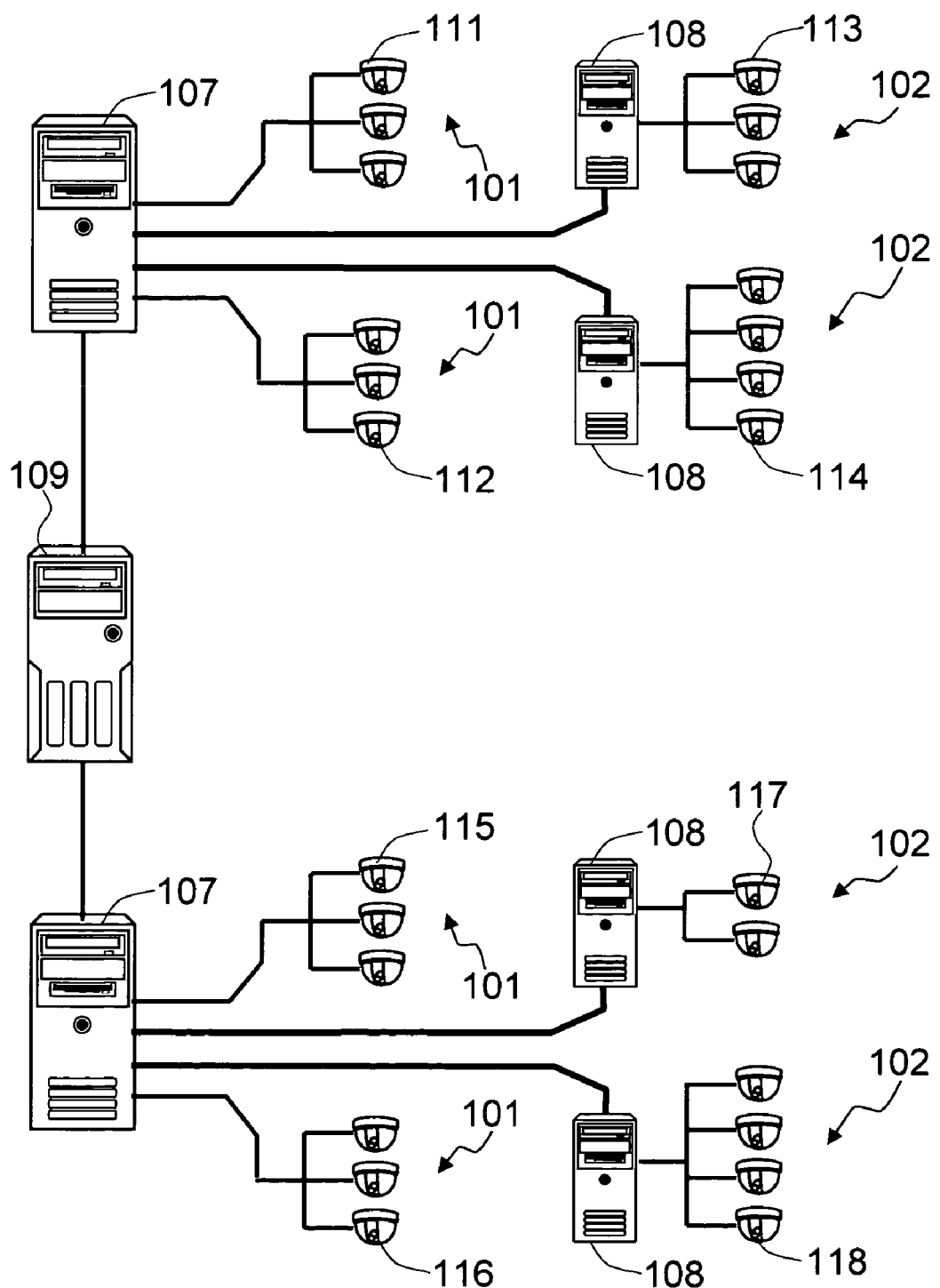
FIG. 23 shows an exemplary network of a plurality of means for control and processing and a plurality of means for capturing images in the present invention that is used to build a consumer decision tree, where the network further consists of a plurality of first means for control and processing and a plurality of second means for control and processing.

FIG. 23 shows an exemplary network of a plurality of means for control and processing and a plurality of means for capturing images in the present invention that is used to build a consumer decision tree, where the network further consists of a plurality of first means for control and processing and a plurality of second means for control and processing, which communicate with each other to synchronize the time-stamped lists of measurement among a plurality of video streams captured by the means for capturing images in the measured locations.

The present invention is an apparatus for building a consumer decision tree based on in-store visual observation for behavior patterns and demographics of the people that shop in a store area. The apparatus comprises means for capturing a plurality of input images of the people by at least a means for capturing images, e.g., first means for capturing images 101 and second means for capturing images 102, in the vicinity of the measurement area, means for processing the plurality of input images, e.g., first means for control and processing 107 or second means for control and processing 108, in order to measure the behavior patterns and demographics of each person in the people in the measurement area. The apparatus also comprises means for aggregating the measurements for the behavior patterns and demographics of the people. The behavior patterns comprise interaction with the categories and purchase of products in the store area. The first means for control and processing 107 or second means for control and processing 108 may be used as the exemplary embodiment of these means for aggregating the measurements.

In the exemplary embodiment, a plurality of means for capturing images, e.g., a plurality of first means for capturing images 101, are connected to the means for video interface in a means for control and processing, e.g., a first means for control and processing 107.

The sensors are placed in a distributed architecture to facilitate the measurement of the response data. If the distance between the plurality of means for capturing images is greater than a means for control and processing can handle, the plurality of means for capturing images can be connected to multiple means for video interface.

For example, in the exemplary embodiment shown in FIG. 23, a plurality of first means for capturing images 101, such as a "means for capturing images 1" 111 and a "means for capturing images 2" 112, are connected to the means for video interface in a first means for control and processing 107 that is different from the first means for control and processing 107 of another plurality of first means for capturing images 101, such as a "means for capturing images 5" 115 and a "means for capturing images 6" 116. The plurality of means for control and processing can be connected in a local area network and communicate with each other.

In an exemplary deployment of the system that embodies the present invention, the first means for capturing images 101 can be installed where the field-of-view can cover the traffic of the people in the measured location and the second means for capturing images 102 can be installed in an area in which the frontal view of the people can be captured. The means for capturing images are connected to the means for video interface through cables.

The digitized video data from the means for video interface is transferred to the means for control and processing that executes computer vision algorithms on the data. The means for control and processing can have internal means for storing data or external means for storing data.

The means for capturing images can comprise an analog camera, USB camera, or Firewire camera. The means for video interface, which can comprise a video frame grabber, USB interface, or Firewire interface, are typically included in the same enclosure as the means for control and processing.

The means for control and processing can be a general purpose personal computer, such as a Pentium 4 PC, or a dedicated hardware, such as an FPGA-based implementation of a device, which can carry out the required computation. The means for control and processing, as well as the means for video interface, can be placed locally or remotely, as long as the connection to the means for capturing images can be established.

The internal means for storing data, such as the internal hard disk drives, is placed within the same enclosure as the means for control and processing. The external means for storing data, such as a network storage driver or internal hard disk drives contained in a remote computer, can be placed locally or remotely, as long as a means for transferring data is available.

The present invention can generate time-stamped measurements in accordance with the behavior analysis and segmentation, utilizing a time server 109. The exemplary time server 109 can maintain a synchronized time in the network of means for control and processing. In another exemplary embodiment, a first means for control and processing 107 can act as a server, and a plurality of second means for control and processing 108 can act as clients. The server can run its own local clock or be connected to a global time server 109 for the synchronization utilizing a time synchronization protocol, such as the Network Time Protocol (NTP). The time-stamped measurements facilitate the synchronized analysis, calculation, and utilization of the measurements.

The number of means for capturing images per a means for control and processing varies, depending on the system configuration in the physical space. However, each means for control and processing knows the identification of the associated plurality of means for capturing images that are assigned to the selected locations in a store area and the area covered by the means for capturing images.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for building a consumer decision tree based on in-store purchase behavior analysis by the measurement of a set of consumer behavior metrics, comprising the following steps of:
a) capturing a plurality of input images of consumers by at least a means for capturing images in a store area,
b) processing the plurality of input images in order to analyze the behavior of the consumers,
c) measuring decision activities of the consumers tied to product categories based on the behavior analysis,
d) creating a plurality of datasets by accumulating the decision activities, whereby decision activity is measured based on the actual in-store purchase behavior of the consumers including interaction with products and travel paths to categories, as opposed to using intercepts or panels to develop them, and
e) constructing a hierarchical decision tree structure, clustering the consumer behavior data based on the measurement of the decision activities by the consumers, which comprises nodes and edges,
wherein a node represents in-store purchase behavior of the consumer,
wherein the number of nodes is predefined, and
wherein an edge represents the transition of the decision activities.

2. The method according to claim 1, wherein the method further comprises a step of objectively capturing a large amount of statistical data, whereby the gathered data is unbiased.

3. The method according to claim 1, wherein the method further comprises a step of calculating which decision was made by the majority of consumers based on a large number of gathered samples.

4. The method according to claim 1, wherein the method further comprises a step of calculating a dominant path among decision paths in the consumer decision tree.

5. The method according to claim 1, wherein the method further comprises a step of constructing a decision sub-tree for each consumer.

6. The method according to claim 1, wherein the method further comprises a step of organizing decision paths for consumer segments by demographic class or by need states,
   wherein attributes for the demographic class comprise age, gender, and ethnicity.

7. The method according to claim 1, wherein the method further comprises a step of counting selection activities according to the category, product, brand, size of product package made by the decision activities, based on spatial and temporal observation using video analytics.

8. The method according to claim 1, wherein the method further comprises steps of:
   a) organizing products in a coordinate system according to predefined attributes,
   b) measuring what attributes in the attribute block are chosen, and
   c) measuring the sequence of the chosen attributes,
   wherein the attributes comprise brand, product type, size, flavor, and price.

9. The method according to claim 1, wherein the method further comprises a step of developing a planogram that matches the decision process of the consumer as well as their needs.

10. The method according to claim 1, wherein the method further comprises a step of managing categories based on the consumer decision tree,
    wherein category management comprises sku rationalization, assortment of categories, and efficient space allocation.

11. The method according to claim 1, wherein the method further comprises a step of developing product assortments based on an understanding of a hierarchy of category decisions.

12. The method according to claim 1, wherein the method further comprises a step of processing allocation of retail space based on the consumer decision tree.

13. The method according to claim 1, wherein the method further comprises a step of integrating a semi-automated method to compute the consumer decision tree to identify behaviors that cannot be automatically observed or to identify granular details of consumer interaction with products.

14. The method according to claim 1, wherein the method further comprises a step of superimposing price elasticity on behavior, based on point-of-sale data from several price points.

15. The method according to claim 1, wherein the method further comprises a step of detecting a sequence of decision activities that are made by a consumer,
    wherein the sequence of decision activities is a decision path from a node to the next node, and
    wherein the sequence of decision activities shows end-to-end decisions made by the consumer.

16. The method according to claim 1, wherein the method further comprises a step of optimizing marketing based on the consumer decision tree.

17. The method according to claim 1, wherein the method further comprises a step of measuring different levels of decision steps based on lengths of decision paths,
    wherein average time of making a decision can be calculated based on the levels of decision steps.

18. The method according to claim 1, wherein the method further comprises a step of measuring a premeditated decision compared to impulse decision based on the consumer decision tree.

19. The method according to claim 1, wherein the method further comprises a step of quantifying a percentage of consumers for each node.

20. An apparatus for building a consumer decision tree based on in-store purchase behavior analysis by the measurement of a set of consumer behavior metrics, comprising:
    a) at least a means for capturing images that captures a plurality of input images of consumers in a store area,
    b) at least a computer programmed to execute the following steps of:
    processing the plurality of input images in order to analyze the behavior of the consumers,
    measuring decision activities of the consumers tied to product categories based on the behavior analysis,
    creating a plurality of datasets by accumulating the decision activities,
    whereby decision activity is measured based on the actual in-store purchase behavior of the consumers including interaction with products and travel paths to categories, as opposed to using intercepts or panels to develop them, and
    constructing a hierarchical decision tree structure, clustering the consumer behavior data based on the measurement of the decision activities by the consumers, which comprises nodes and edges,
    wherein a node represents in-store purchase behavior of the consumer,
    wherein the number of nodes is predefined, and
    wherein an edge represents the transition of the decision activities.

* * * * *